(12) United States Patent
Bisain et al.

(10) Patent No.: US 12,347,114 B2
(45) Date of Patent: *Jul. 1, 2025

(54) OBJECT SEGMENTATION AND FEATURE TRACKING

(71) Applicant: QUALCOMM Incorporated, San Diego, CA (US)

(72) Inventors: Abhijeet Bisain, San Diego, CA (US); Gerhard Reitmayr, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/343,591

(22) Filed: Jun. 28, 2023

(65) Prior Publication Data

US 2023/0342943 A1 Oct. 26, 2023

Related U.S. Application Data

(63) Continuation of application No. 17/127,568, filed on Dec. 18, 2020, now Pat. No. 11,727,576.

(51) Int. Cl.
*G06T 7/174* (2017.01)

(52) U.S. Cl.
CPC .... *G06T 7/174* (2017.01); *G06T 2207/20084* (2013.01)

(58) Field of Classification Search
CPC ........... G06T 7/174; G06T 2207/20084; G06T 2207/20021; G06T 2207/20081; G06T 2207/30244; G06T 7/246
See application file for complete search history.

(56) References Cited

U.S. PATENT DOCUMENTS 9,652,681 B1 * 5/2017 Tucker ................. G06V 10/255
9,904,852 B2 * 2/2018 Divakaran ............ G06V 20/52
(Continued)

OTHER PUBLICATIONS

Han S., et al., "Monocular SLAM and Obstacle Removal for Indoor Navigation", 2018 International Conference on Machine Learning and Data Engineering (ICMLDE), IEEE, Dec. 3, 2018, pp. 67-76, XP033502183, DOI:10.1109/ICMLDE.2018.00023 [retrieved on Jan. 15, 2019].

(Continued)

*Primary Examiner* — Bobbak Safaipour
(74) *Attorney, Agent, or Firm* — QUALCOMM Incorporated

(57) ABSTRACT

Examples are described for processing images to mask dynamic objects out of images to improve feature tracking between images. A device receives an image of an environment captured by an image sensor. The image depicts at least a static portion of the environment and a dynamic object in the environment. The device identifies a portion of the image that includes a depiction of the dynamic object. For example, the device can detect a bounding box around the dynamic object, or can detect which pixels in the image correspond to the dynamic object. The device generates a masked image at least by masking the portion of the image. The device identifies features in the masked image, and uses the features from the masked image for feature tracking from other images of the environment, masked or otherwise. The device can use this feature tracking for mapping, localization, and/or relocation.

31 Claims, 16 Drawing Sheets

(56) References Cited

U.S. PATENT DOCUMENTS

| | | | | |
|---|---|---|---|---|
| 9,965,865 | B1* | 5/2018 | Agrawal | G06V 10/7747 |
| 10,860,034 | B1* | 12/2020 | Ziyaee | G06N 3/045 |
| 11,145,076 | B1* | 10/2021 | Horesh | G06T 7/74 |
| 11,727,576 | B2* | 8/2023 | Bisain | G06T 7/174 |
| | | | | 382/103 |
| 2008/0226128 | A1* | 9/2008 | Birtwistle | H04N 13/261 |
| | | | | 382/103 |
| 2017/0294210 | A1* | 10/2017 | Abramson | G06V 20/47 |
| 2019/0383945 | A1* | 12/2019 | Wang | G01S 7/4861 |
| 2020/0226769 | A1* | 7/2020 | Das | G06T 7/254 |
| 2021/0012503 | A1* | 1/2021 | Cho | G06F 18/24 |
| 2021/0097296 | A1* | 4/2021 | Wang | G06V 20/53 |
| 2021/0129868 | A1* | 5/2021 | Nehmadi | G06V 20/597 |
| 2021/0206312 | A1* | 7/2021 | Mochizuki | G08G 1/166 |
| 2021/0264167 | A1* | 8/2021 | Chen | G06V 10/82 |
| 2021/0383018 | A1* | 12/2021 | Keskikangas | G06F 21/6209 |
| 2021/0383553 | A1* | 12/2021 | Guizilini | G06T 7/20 |
| 2022/0012916 | A1* | 1/2022 | Srinivasan | G06V 20/56 |
| 2022/0044042 | A1* | 2/2022 | Kefayati | G06T 7/194 |
| 2022/0084234 | A1* | 3/2022 | Lee | G06V 10/803 |
| 2022/0101539 | A1* | 3/2022 | Lin | G01P 13/00 |
| 2022/0156943 | A1* | 5/2022 | Zhang | G06N 3/044 |
| 2022/0189029 | A1* | 6/2022 | Mequanint | G06T 7/194 |
| 2022/0189108 | A1* | 6/2022 | Shandilya | G06F 18/21 |
| 2022/0198677 | A1* | 6/2022 | Bisain | G06T 7/174 |
| 2022/0254146 | A1* | 8/2022 | Zou | G06V 10/82 |
| 2022/0294998 | A1* | 9/2022 | Ronchini Ximenes | H04N 25/75 |
| 2023/0135137 | A1* | 5/2023 | Yang | G06T 7/10 |
| | | | | 706/15 |

OTHER PUBLICATIONS

International Search Report and Written Opinion—PCT/US2021/072551—ISA/EPO—Mar. 2, 2022.

Kaneko M., et al., "Mask-SLAM: Robust Feature-Based Monocular SLAM by Masking Using Semantic Segmentation," 2018 IEEE/CVF Conference on Computer Vision and Pattern Recognition Workshops (CVPRW), Jun. 18-22, 2018, pp. 371-379, XP033475660, DOI: 10.1109/CVPRW.2018.00063.

Soares J.C.V., et al., "Visual SLAM in Human Populated Environments: Exploring the Trade-off between Accuracy and Speed of YOLO and Mask R-CNN," 19th International Conference on Advanced Robotics (ICAR), Dec. 2019, pp. 135-140, XP033702850, DOI: 10.1109/ICAR46387.2019.8981617.

Venator M., et al., "Robust Camera Pose Estimation for Unordered Road Scene Images in Varying Viewing Conditions", IEEE Transactions on Intelligent Vehicles, IEEE, vol. 5, No. 1, Nov. 22, 2019, pp. 165-174, XP011774774, ISSN: 2379-8858, DOI: 10.1109/TIV.2019.2955375 [retrieved on Feb. 25, 2020].

* cited by examiner

OBJECT SEGMENTATION AND FEATURE TRACKING

CROSS-REFERENCE TO RELATED APPLICATIONS

This application is a continuation of U.S. Non-Provisional application Ser. No. 17/127,568, filed Dec. 18, 2020, which is hereby incorporated by reference, in its entirety and for all purposes.

FIELD

This application is related to image processing. More specifically, this application relates to systems and methods of automatically identifying dynamic objects within images to improve feature tracking, mapping, localization, and/or relocation.

BACKGROUND

Visual simultaneous localization and mapping (VSLAM) is a computational geometry technique used in devices with cameras, such as robots and autonomous vehicles. In VSLAM, a device constructs and updates a map of an unknown environment based on images captured by the device's camera. The device can keep track of the device's location within the environment as the device updates the map. For example, the device can be activated in a particular room of a building and can move throughout the interior of the building, capturing images. The device can map the environment, and keep track of its location in the environment, based on tracking where different objects in the environment appear in different images.

Some environments may have dynamic objects that may change location and/or appearance from one image to another. For example, a location-changing dynamic object may be a human being or an animal that moves throughout the environment, and therefore may be present in different locations in the environment in images captured at different times. Such a location-changing dynamic object may produce errors in a map and/or device location determined by a VSLAM device that recognizes the location-changing dynamic object and assumes that the location-changing dynamic object is static. An appearance-changing dynamic object may, for example, be a display screen or a mirror, which may look visually different in two images depending on when the images are captured and/or where the images are captured from. Such an appearance-changing dynamic object may also produce errors in a map and/or device location determined by a VSLAM device that fails to recognize the appearance-changing dynamic object in different images due to its changed appearance.

SUMMARY

Systems and techniques are described herein for processing images. In some examples, a device can receive an image of an environment captured by an image sensor. The image depicts at least a static portion of the environment and a dynamic object in the environment. The device can identify a portion of the image that includes a depiction of the dynamic object. For example, the device can detect a bounding box around the dynamic object and/or can detect which pixels in the image correspond to the dynamic object. The device can generate a masked image at least by masking the portion of the image that includes the depiction of the dynamic object. The device can identify features in the masked image, and can use the features from the masked image for feature tracking from other images of the environment, masked or otherwise. The device can use this feature tracking for mapping, localization, relocation, and/or other operations, such as operations related to simultaneous localization and mapping (SLAM).

In one example, an apparatus for image processing is provided. The apparatus includes a memory and one or more processors (e.g., implemented in circuitry) coupled to the memory. The one or more processors are configured to and can: receive an image of an environment captured by an image sensor, wherein the image depicts at least a static portion of the environment and a dynamic object in the environment; identify a portion of the image that includes a depiction of the dynamic object; generate a masked image at least by masking the portion of the image that includes the depiction of the dynamic object; identify one or more features in the masked image; and track the one or more features between the masked image and one or more additional images of the environment.

In another example, a method of image processing is provided. The method includes receiving image data captured by an image sensor. The method includes receiving an image of an environment captured by an image sensor, wherein the image depicts at least a static portion of the environment and a dynamic object in the environment. The method includes identifying a portion of the image that includes a depiction of the dynamic object. The method includes generating a masked image at least by masking the portion of the image that includes the depiction of the dynamic object. The method includes identifying one or more features in the masked image. The method includes tracking the one or more features between the masked image and one or more additional images of the environment.

In another example, a non-transitory computer-readable medium is provided that has stored thereon instructions that, when executed by one or more processors, cause the one or more processors to: receive an image of an environment captured by an image sensor, wherein the image depicts at least a static portion of the environment and a dynamic object in the environment; identify a portion of the image that includes a depiction of the dynamic object; generate a masked image at least by masking the portion of the image that includes the depiction of the dynamic object; identify one or more features in the masked image; and track the one or more features between the masked image and one or more additional images of the environment.

In another example, an apparatus for image processing is provided. The apparatus includes a means for receiving an image of an environment captured by an image sensor, wherein the image depicts at least a static portion of the environment and a dynamic object in the environment. The apparatus includes a means for identifying a portion of the image that includes a depiction of the dynamic object. The apparatus includes a means for generating a masked image at least by masking the portion of the image that includes the depiction of the dynamic object. The apparatus includes a means for identifying one or more features in the masked image. The apparatus includes a means for tracking the one or more features between the masked image and one or more additional images of the environment.

In some aspects, the methods, apparatuses, and computer-readable medium described above further comprise: determining a location of a first feature of the one or more features based on tracking of the one or more features between the masked image and the one or more additional images of the environment; and updating a map of the environment based on the location of the first feature. In some aspects, updating the map of the environment based on the location include adding the location of the first feature to the map. In some aspects, updating the map of the environment based on the location include modifying a prior location of the first feature in the map based on the location of the first feature.

In some aspects, the methods, apparatuses, and computer-readable medium described above further comprise: determining a pose of the apparatus within the environment based on tracking of the one or more features between the masked image and the one or more additional images of the environment, wherein the pose of the apparatus within the environment includes at least one of a location of the apparatus, a pitch of the apparatus, a roll of the apparatus, and a yaw of the apparatus. In some aspects, the methods, apparatuses, and computer-readable medium described above further comprise: determining a pose of the image sensor within the environment based on tracking of the one or more features between the masked image and the one or more additional images of the environment, wherein the pose of the image sensor within the environment includes at least one of a location of the image sensor, a pitch of the image sensor, a roll of the image sensor, and a yaw of the image sensor.

In some aspects, the methods, apparatuses, and computer-readable medium described above further comprise: generating a downscaled image at least by downscaling the image, wherein identifying the portion of the image that includes the depiction of the dynamic object includes identifying a portion of the downscaled image that includes the depiction of the dynamic object. In some aspects, the methods, apparatuses, and computer-readable medium described above further comprise: generating a greyscale image at least by desaturating color in the image, wherein identifying the portion of the image that includes the depiction of the dynamic object includes identifying a portion of the greyscale image that includes the depiction of the dynamic object.

In some aspects, identifying the portion of the image that includes the depiction of the dynamic object includes: analyzing each pixel of a plurality of pixels corresponding to the image to identify a subset of the plurality of pixels that depicts at least a portion of the dynamic object.

In some aspects, identifying the portion of the image that includes the depiction of the dynamic object includes: identifying a bounding box occupying a polygonal region of the image, wherein the depiction of the dynamic object is at least partially included within the bounding box. In some aspects, identifying the portion of the image that includes the depiction of the dynamic object includes: analyzing each pixel of a plurality of pixels within the bounding box to identify a subset of the plurality of pixels within the bounding box that each depict a portion of the dynamic object. In some aspects, to identify the bounding box, the one or more processors are configured to use at least a first trained neural network. In some aspects, to identify the subset of the plurality of pixels, the one or more processors are configured to use at least a second trained neural network.

In some aspects, identifying the portion of the image that includes the depiction of the dynamic object includes: identifying, using at least a first trained neural network, that the image includes the depiction of the dynamic object; and identifying, using at least a second trained neural network in response to identification that the image includes the depiction of the dynamic object, the portion of the image that includes the depiction of the dynamic object.

In some aspects, masking the portion of the image that includes the depiction of the dynamic object includes: generating a mask having a same shape and a same size as the portion of the image that includes the depiction of the dynamic object; overlaying the mask over the portion of the image that includes the depiction of the dynamic object; and merging the mask with the image after overlaying the mask over the portion of the image that includes the depiction of the dynamic object. In some aspects, masking the portion of the image that includes the depiction of the dynamic object includes: blurring the mask before merging the mask with the image.

In some aspects, the methods, apparatuses, and computer-readable medium described above further comprise: identifying a second portion of the image that includes a second depiction of a second dynamic object, wherein the image depicts the second dynamic object in the environment; wherein, to generate the masked image, the one or more processors are configured to mask the second portion of the image that includes the second depiction of the second dynamic object.

In some aspects, the methods, apparatuses, and computer-readable medium described above further comprise: receiving a second image of the environment captured by the image sensor, the second image being one of the one or more additional images of the environment; identifying a second portion of the second image that includes a second depiction of one of the dynamic object or a second dynamic object; and masking the second portion of the second image before tracking the one or more features between the masked image and one or more additional images of the environment.

In some aspects, the dynamic object is a person, and wherein, to identify the portion of the image that includes the depiction of the dynamic object, the one or more processors are configured to identify a depiction of a face of the person using facial detection.

In some aspects, the one or more features are in the static portion of the environment. In some aspects, the static portion of the environment is static relative to a position of the image sensor during capture of the image. In some aspects, the dynamic object moves relative to a position of the image sensor during capture of the image.

In some aspects, the apparatus comprises a camera, a mobile device (e.g., a mobile telephone or so-called "smart phone" or other mobile device), a wireless communication device, a wearable device, an extended reality device (e.g., a virtual reality (VR) device, an augmented reality (AR) device, or a mixed reality (MR) device), a personal computer, a laptop computer, a server computer, or other device. In some aspects, the one or more processors include an image signal processor (ISP). In some aspects, the apparatus includes a camera or multiple cameras for capturing one or more images. In some aspects, the apparatus includes an image sensor that captures the image data. In some aspects, the apparatus further includes a display for displaying the image, one or more notifications (e.g., associated with processing of the image), and/or other displayable data.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
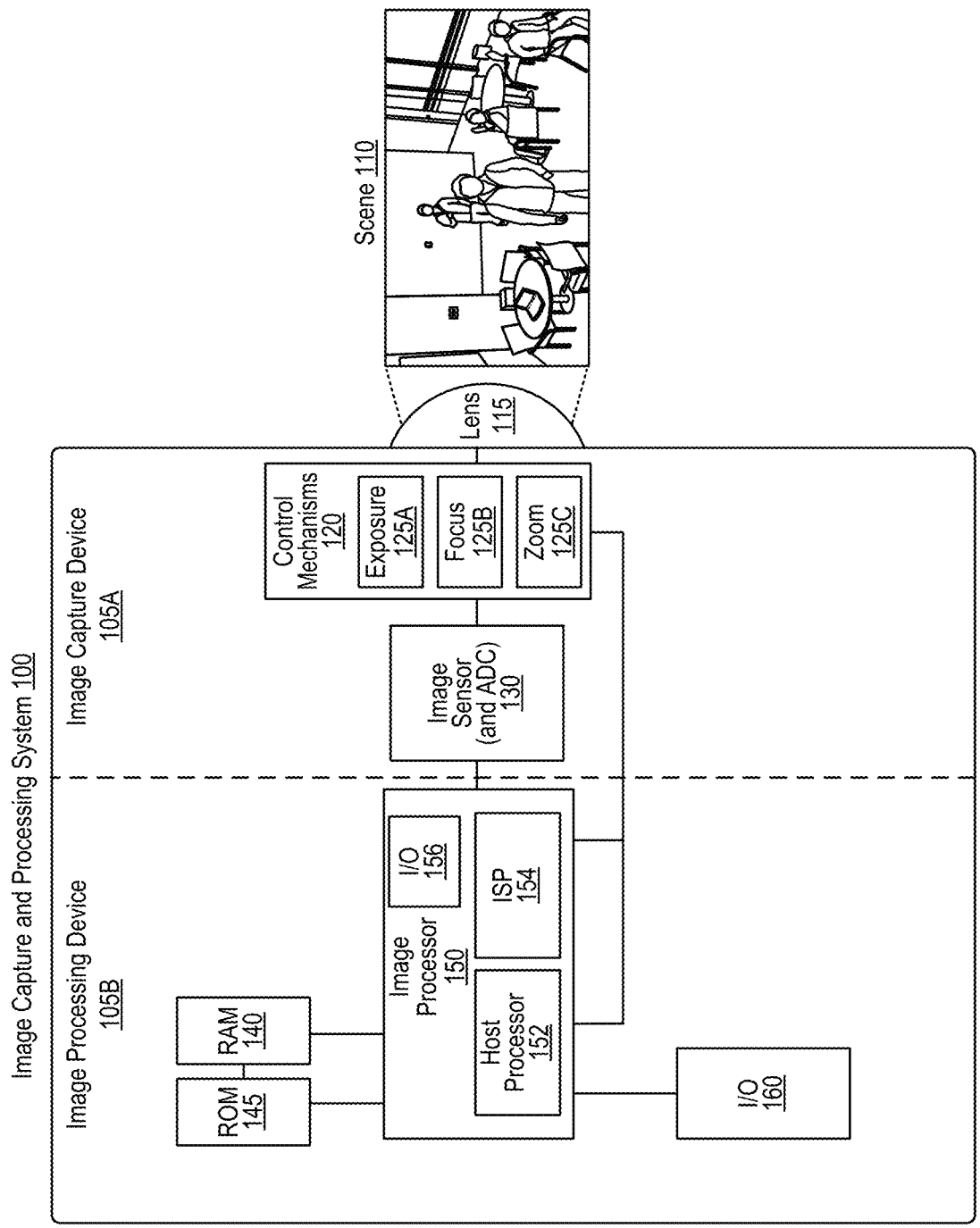
FIG. 1 is a block diagram illustrating an architecture of an image capture and processing device.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

An image capture device (e.g., a camera) is a device that receives light and captures image frames, such as still images or video frames, using an image sensor. The terms "image," "image frame," and "frame" are used interchangeably herein. An image capture device typically includes at least one lens that receives light from a scene and bends the light toward an image sensor of the image capture device. The light received by the lens passes through an aperture controlled by one or more control mechanisms and is received by the image sensor. The one or more control mechanisms can control exposure, focus, and/or zoom based on information from the image sensor and/or based on information from an image processor (e.g., a host or application process and/or an image signal processor). In some examples, the one or more control mechanisms include a motor or other control mechanism that moves a lens of an image capture device to a target lens position.

Visual simultaneous localization and mapping (VSLAM) is a computational geometry technique used in devices with cameras, such as robots, head-mounted displays (HMDs), mobile handsets, and autonomous vehicles. In VSLAM, a device can construct and update a map of an unknown environment based on images captured by the device's camera. The device can keep track of the device's pose within the environment (e.g., location and/or orientation) as the device updates the map. For example, the device can be activated in a particular room of a building and can move throughout the interior of the building, capturing images. The device can map the environment, and keep track of its location in the environment, based on tracking where different objects in the environment appear in different images.

Some environments may have dynamic objects that may change location and/or appearance from one image to another. For example, a pose-changing dynamic object may be a human being, an animal, a vehicle, or a robot that moves throughout the environment, and therefore may be present in different locations in the environment in images captured at different times. Such a pose-changing dynamic object may produce errors in a map and/or device location determined by a VSLAM device that recognizes the pose-changing dynamic object and assumes that the pose-changing dynamic object is a static object in the environment or scene. An appearance-changing dynamic object may, for example, be a display screen or a mirror, which may look visually different in two images depending on when the images are captured and/or the pose (e.g., location and/or orientation) of the camera capturing the image. Such an appearance-changing dynamic object may also produce errors in a map and/or device location determined by a VSLAM device that fails to recognize the same appearance-changing dynamic object in different images due to the changed appearance of the appearance-changing dynamic object.

As described in more detail below, systems, apparatuses, methods (also referred to as processes, and computer-readable media (collectively referred to herein as "systems and techniques") are described herein for performs image processing in some cases by masking depictions of objects in images of an environment. The systems and techniques can improve the effectiveness of image processing operations within the environment. For example, the systems and techniques can improve the effectiveness of operations related to simultaneous localization and mapping (SLAM) within the environment, such as feature tracking, mapping, localization, relocation, other operations discussed herein, or combinations thereof.

In some examples, a device is described herein that can receive images of an environment captured by an image sensor. The device can be any computing device, such as, for example, an autonomous vehicle, a head-mounted display (HMD), a mobile handset, a personal computer, a tablet computer, or another type of device. For each image, the device can identify a portion of the image that includes a depiction of the dynamic object, a process that may be referred to as image segmentation, dynamic object segmentation, dynamic object identification, dynamic object classification, dynamic object detection, or a combination thereof. For example, the device can detect a bounding box around the dynamic object, can detect which pixels in the image correspond to the dynamic object, or can perform a hybrid of the two. The device can generate a masked image at least by masking the portion of the image that includes the depiction of the dynamic object. The device can then use the masked image of the environment, in some cases along with additional masked images of the environment, for the image processing operations. For example, the device can use the masked image (and in some cases additional masked images) for feature tracking, mapping, and/or other operations associated with VSLAM.

One technical effect of use of image segmentation and dynamic object masking is a performance improvement in, and a reduction in errors in, feature tracking, mapping, localization, relocation, and/or other SLAM-related operations. For instance, the device can effectively ignore the masked dynamic objects for the purposes of feature tracking, mapping, localization, relocation, etc. By ignoring the masked dynamic objects, the device does not erroneously track features of human beings or other dynamic objects with the assumption that those dynamic objects are not static portions of the environment. For example, the device can avoid erroneously identifying that the device is in a previously-visited location just because the device recognizes features of a human being or other dynamic object that has moved in the environment. In another example, when the device does visit a previously-visited location, the device does can avoid erroneously identifying different features in a portion of the environment where the device previously identified a dynamic object, due to the dynamic object moving from the location or changing appearance. For instance, one metric used to track errors in SLAM is translation root mean square error (RMSE) compared to ground truth, where a lower translation RMSE is better than a higher translation RMSE. In some tests, VSLAM performed without image segmentation and dynamic object masking produces a translation RSME of 40 centimeters (cm) compared to ground truth, while VSLAM performed with image segmentation and dynamic object masking under otherwise similar conditions produces a translation RSME of 6.3 cm compared to ground truth.

Various aspects of the application will be described with respect to the figures. FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by an image sensor 130.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses may be included in the system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors (e.g., image sensor 130) may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 1510 discussed with respect to the computing device 1500. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1020, read-only memory (ROM) 145/1025, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1035, any other input devices 1045, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the system 100 and one or more peripheral devices, over which the system 100 may receive data from the one or more peripheral device and/or transmit data to the one or more peripheral devices. The I/O 160 may include one or more wireless transceivers that enable a wireless connection between the system 100 and one or more peripheral devices, over which the system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2A:
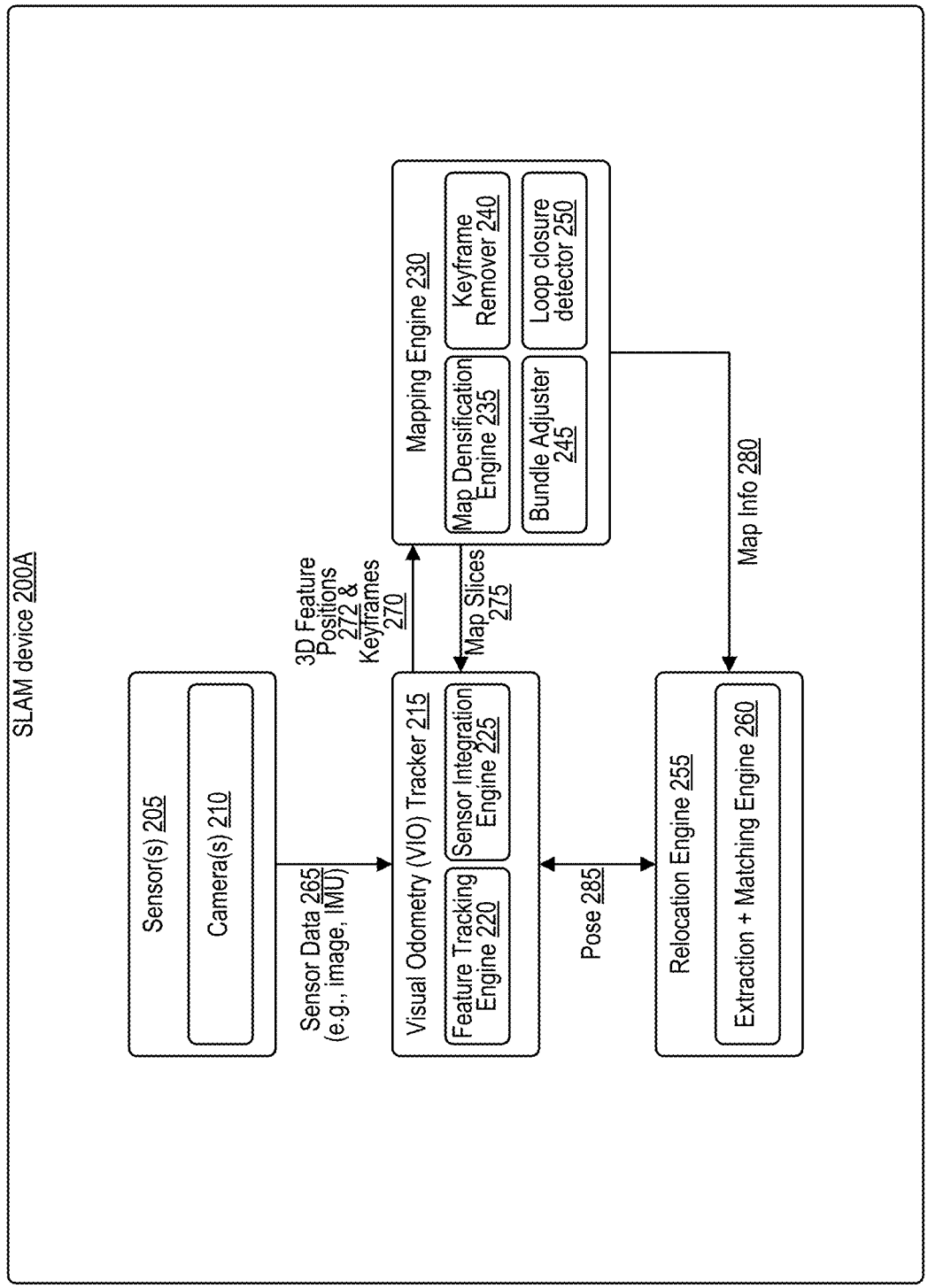
FIG. 2A is a block diagram illustrating an architecture of a simultaneous localization and mapping (SLAM) device.

FIG. 2A is a block diagram illustrating an architecture of a simultaneous localization and mapping (SLAM) device 200A. In some examples, the SLAM device 200A can be an extended reality (XR) device (e.g., a virtual reality (VR) device, an augmented reality (AR) device, a mixed reality (MR) device, a combination thereof, or other type of XR device), such as a head-mounted display (HMD). In some examples, the SLAM device 200A can be a wireless communication device, a mobile device or handset (e.g., a mobile telephone or so-called "smart phone" or other mobile device), a wearable device, a personal computer, a laptop computer, a server computer, a portable video game console, a portable media player, a camera device, a manned or unmanned ground vehicle, a manned or unmanned aerial vehicle, a manned or unmanned aquatic vehicle, a manned or unmanned underwater vehicle, a manned or unmanned vehicle, a vehicle (e.g., an autonomous vehicle) or computing device of a vehicle, a robot, any combination thereof, and/or other device.

The SLAM device 200A of FIG. 2A includes, or is coupled to, each of one or more sensors 205. The one or more sensors 205 can include one or more cameras 210. Each of the one or more cameras 210 may include an image capture device 105A, an image processing device 105B, an image capture and processing device 100, another type of camera, or a combination thereof. Each of the one or more cameras 210 may be responsive to light from a particular spectrum of light. The spectrum of light may be a subset of the electromagnetic (EM) spectrum. For example, each of the one or more cameras 210 may be a visible light (VL) camera responsive to a VL spectrum, an infrared (IR) camera responsive to an IR spectrum, an ultraviolet (UV) camera responsive to a UV spectrum, a camera responsive to light from another spectrum of light from another portion of the electromagnetic spectrum, or a some combination thereof.

The one or more sensors 205 can include one or more other types of sensors other than cameras 210, such as one or more of each of: accelerometers, gyroscopes, magnetometers, inertial measurement units (IMUs), altimeters, barometers, thermometers, radio detection and ranging (RADAR) sensors, light detection and ranging (LIDAR) sensors, sound navigation and ranging (SONAR) sensors, sound detection and ranging (SODAR) sensors, global navigation satellite system (GNSS) receivers, global positioning system (GPS)

receivers, BeiDou navigation satellite system (BDS) receivers, Galileo receivers, Globalnaya Navigazionnaya Sputnikovaya Sistema (GLONASS) receivers, Navigation Indian Constellation (NavIC) receivers, Quasi-Zenith Satellite System (QZSS) receivers, Wi-Fi positioning system (WPS) receivers, cellular network positioning system receivers, Bluetooth® beacon positioning receivers, short-range wireless beacon positioning receivers, personal area network (PAN) positioning receivers, wide area network (WAN) positioning receivers, wireless local area network (WLAN) positioning receivers, other types of positioning receivers, other types of sensors discussed herein, or combinations thereof.

The SLAM device 200A of FIG. 2A includes a visual-inertial odometry (VIO) tracker 215. The term visual-inertial odometry is also referred to herein as visual odometry. The VIO tracker 215 receives sensor data 265 from the one or more sensors 205. For instance, the sensor data 265 can include one or more images captured by the one or more cameras 210. The sensor data 265 can include other types of sensor data from the one or more sensors 205, such as data from any of the types of sensors 205 listed herein. For instance, the sensor data 265 can include inertial measurement unit (IMU) data from one or more IMUs of the one or more sensors 205.

Upon receipt of the sensor data 265 from the one or more sensors 205, the VIO tracker 215 performs feature tracking using a feature tracking engine 220 of the VIO tracker 215. For instance, where the sensor data 265 includes one or more images captured by the one or more cameras 210 of the SLAM device 200A, the VIO tracker 215 can identify features in each image. Features may include visually distinctive points in an image, such as portions of the image depicting edges and/or corners. The VIO tracker 215 can receive sensor data 265 periodically and/or continually from the one or more sensors 205, for instance by continuing to receive more images from the one or more cameras 210 as the one or more cameras 210 capture a video, where the images are video frames of the video. The feature tracking engine 220 of the VIO tracker 215 can perform feature tracking by recognizing features in each image that the VIO tracker 215 already previously recognized in one or more previous images. The feature tracking engine 220 can track changes in one or more positions at which the feature is depicted in each of the different images. For example, the feature extraction engine can detect a particular corner of a room depicted in a left side of a first image captured by a first camera of the cameras 210. The feature extraction engine can detect the same feature (e.g., the same particular corner of the same room) depicted in a right side of a second image captured by the first camera. The feature tracking engine 220 can recognize that the features detected in the first image and the second image are two depictions of the same feature (e.g., the same particular corner of the same room), and that the feature appears in two different positions in the two images. The VIO tracker 215 can determine, based on the same feature appearing on the left side of the first image and on the right side of the second image that the first camera has moved, since the feature (e.g., the particular corner of the room) is a static portion of the environment.

The VIO tracker 215 can include a sensor integration engine 225. The sensor integration engine 225 can use sensor data from other types of sensors 205 (other than the cameras 210) to determine information that can be used by the feature tracking engine 220 when performing the feature tracking. For example, the sensor integration engine 225 can receive IMU data (e.g., which can be included as part of the sensor data 265) from an IMU of the one or more sensors 205. The sensor integration engine 225 can determine, based on the IMU data in the sensor data 265, that the SLAM device 200A has rotated 15 degrees in a clockwise direction from acquisition or capture of a first image and capture to acquisition or capture of the second image by a first camera of the cameras 210. Based on this determination, the sensor integration engine 225 can identify that a feature depicted at a first position in the first image is expected to appear at a second position in the second image, and that the second position is expected to be located to the left of the first position by a predetermined distance (e.g., a predetermined number of pixels, inches, centimeters, millimeters, or another distance metric). The feature tracking engine 220 can take this expectation into consideration in tracking features between the first image and the second image.

Based on the feature tracking by the feature tracking engine 220 and/or the sensor integration by the sensor integration engine 225, the VIO tracker 215 can determine a 3D feature positions 272 of a particular feature. The 3D feature positions 272 can include one or more 3D feature positions and can also be referred to as 3D feature points. The 3D feature positions 272 can be a set of coordinates along three different axes that are perpendicular to one another, such as an X coordinate along an X axis (e.g., in a horizontal direction), a Y coordinate along a Y axis (e.g., in a vertical direction) that is perpendicular to the X axis, and a Z coordinate along a Z axis (e.g., in a depth direction) that is perpendicular to both the X axis and the Y axis. The VIO tracker 215 can also determine one or more keyframes 270 (referred to hereinafter as keyframes 270) corresponding to the particular feature. A keyframe (from one or more keyframes 270) corresponding to a particular feature may be an image in which the particular feature is clearly depicted. In some examples, a keyframe (from the one or more keyframes 270) corresponding to a particular feature may be an image in which the particular feature is clearly depicted. In some examples, a keyframe corresponding to a particular feature may be an image that reduces uncertainty in the 3D feature positions 272 of the particular feature when considered by the feature tracking engine 220 and/or the sensor integration engine 225 for determination of the 3D feature positions 272. In some examples, a keyframe corresponding to a particular feature also includes data about the pose 285 of the SLAM device 200A and/or the camera(s) 210 during capture of the keyframe. In some examples, the VIO tracker 215 can send 3D feature positions 272 and/or keyframes 270 corresponding to one or more features to the mapping engine 230. In some examples, the VIO tracker 215 can receive map slices 275 from the mapping engine 230. The VIO tracker 215 can feature information within the map slices 275 for feature tracking using the feature tracking engine 220.

Based on the feature tracking by the feature tracking engine 220 and/or the sensor integration by the sensor integration engine 225, the VIO tracker 215 can determine a pose 285 of the SLAM device 200A and/or of the cameras 210 during capture of each of the images in the sensor data 285. The pose 285 can include a location of the SLAM device 200A and/or of the cameras 210 in 3D space, such as a set of coordinates along three different axes that are perpendicular to one another (e.g., an X coordinate, a Y coordinate, and a Z coordinate). The pose 285 can include an orientation of the SLAM device 200A and/or of the cameras 210 in 3D space, such as pitch, roll, yaw, or some combination thereof. In some examples, the VIO tracker 215 can send the pose 285 to the relocation engine 255. In some examples, the VIO tracker 215 can receive the pose 285 from the relocation engine 255.

The SLAM device 200A also includes a mapping engine 230. The mapping engine 230 generates a 3D map of the environment based on the 3D feature positions 272 and/or the keyframes 270 received from the VIO tracker 215. The mapping engine 230 can include a map densification engine 235, a keyframe remover 240, a bundle adjuster 245, and/or a loop closure detector 250. The map densification engine 235 can perform map densification, in some examples, increase the quantity and/or density of 3D coordinates describing the map geometry. The keyframe remover 240 can remove keyframes, and/or in some cases add keyframes. In some examples, the keyframe remover 240 can remove keyframes 270 corresponding to a region of the map that is to be updated and/or whose corresponding confidence values are low. The bundle adjuster 245 can, in some examples, refine the 3D coordinates describing the scene geometry, parameters of relative motion, and/or optical characteristics of the image sensor used to generate the frames, according to an optimality criterion involving the corresponding image projections of all points. The loop closure detector 250 can recognize when the SLAM device 200A has returned to a previously mapped region, and can use such information to update a map slice and/or reduce the uncertainty in certain 3D feature points or other points in the map geometry. The mapping engine 230 can output map slices 275 to the VIO tracker 215. The map slices 275 can represent 3D portions or subsets of the map. The map slices 275 can include map slices 275 that represent new, previously-unmapped areas of the map. The map slices 275 can include map slices 275 that represent updates (or modifications or revisions) to previously-mapped areas of the map. The mapping engine 230 can output map information 280 to the relocation engine 255. The map information 280 can include at least a portion of the map generated by the mapping engine 230. The map information 280 can include one or more 3D points making up the geometry of the map, such as one or more 3D feature positions 272. The map information 280 can include one or more keyframes 270 corresponding to certain features and certain 3D feature positions 272.

The SLAM device 200A also includes a relocation engine 255. The relocation engine 255 can perform relocation, for instance when the VIO tracker 215 fail to recognize more than a threshold number of features in an image, and/or the VIO tracker 215 loses track of the pose 285 of the SLAM device 200A within the map generated by the mapping engine 230. The relocation engine 255 can perform relocation by performing extraction and matching using an extraction and matching engine 260. For instance, the extraction and matching engine 260 can by extract features from an image captured by the cameras 210 of the SLAM device 200A while the SLAM device 200A is at a current pose 285, and can match the extracted features to features depicted in different keyframes 270, identified by 3D feature positions 272, and/or identified in the map information 280. By matching these extracted features to the previously-identified features, the relocation engine 255 can identify that the pose 285 of the SLAM device 200A is a pose 285 at which the previously-identified features are visible to the cameras 210 of the SLAM device 200A, and is therefore similar to one or more previous poses 285 at which the previously-identified features were visible to the cameras 210. The relocation engine 255 can receive pose information 285 from the VIO tracker 215, for instance regarding one or more recent poses of the SLAM device 200A and/or cameras 210, which the relocation engine 255 can base its relocation determination on. Once the relocation engine 255 relocates the SLAM device 200A and/or cameras 210 and thus determines the pose 285, the relocation engine 255 can output the pose 285 to the VIO tracker 215.

Figure 2B:
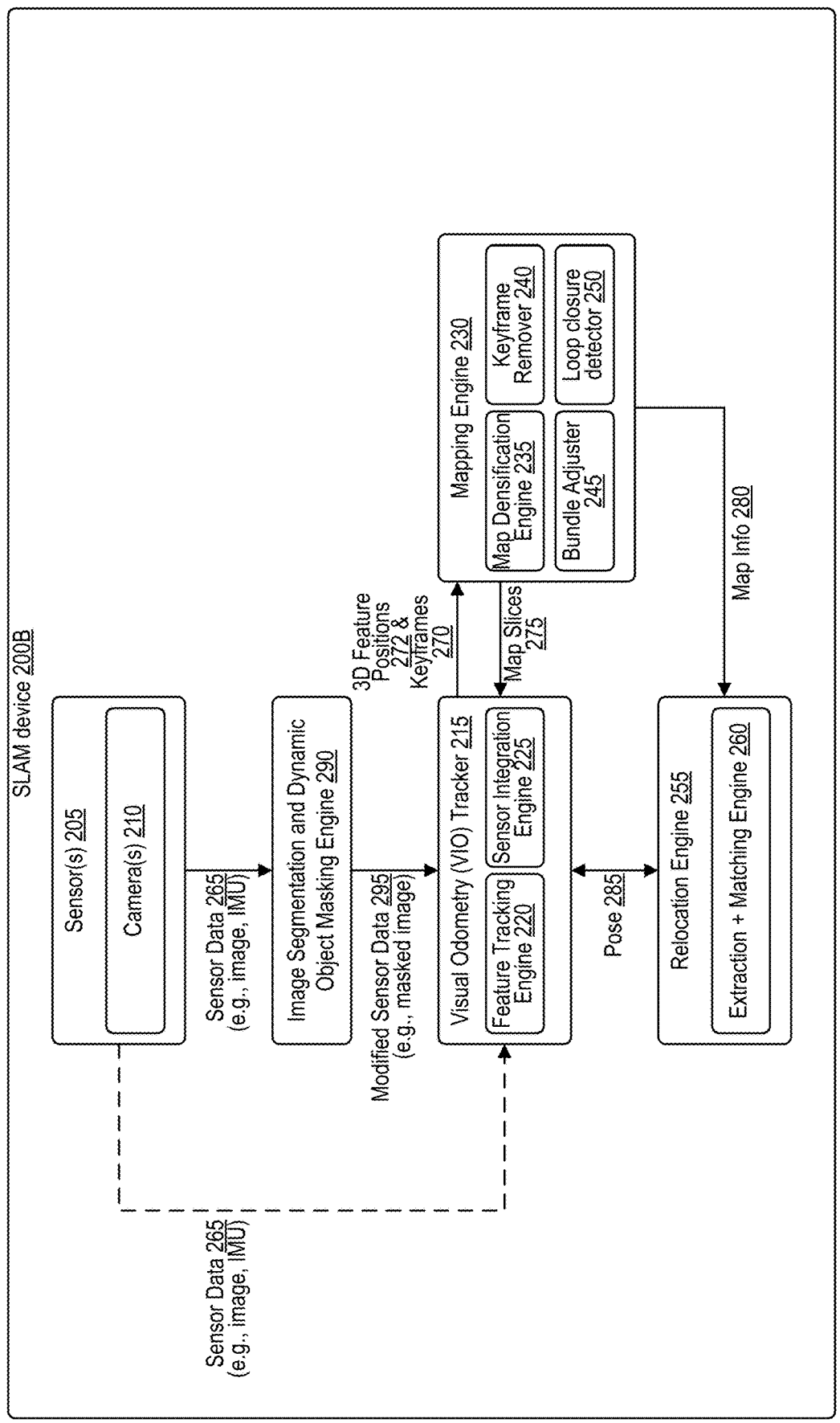
FIG. 2B is a block diagram illustrating an architecture of a simultaneous localization and mapping (SLAM) device with image segmentation and masking.

FIG. 2B is a block diagram illustrating an architecture of a simultaneous localization and mapping (SLAM) device 200B with an image segmentation and dynamic object masking engine 290. The SLAM device 200B of FIG. 2B is similar to and can perform some or all of the operations of the SLAM device 200A of FIG. 2A, with the image segmentation and dynamic object masking engine 290. The image segmentation and dynamic object masking engine 290 receives the sensor data 265 from the one or more sensors 205, for example receiving one or more images captured by the one or more cameras 210. For each image received by the image segmentation and dynamic object masking engine 290, the image segmentation and dynamic object masking engine 290 can rescale and/or resample the image. In some examples, rescaling and/or resampling the image can include downscaling, downsampling, subscaling, and/or subsampling the image one or more times, for instance by generating a multi-scale image pyramid and obtaining one of the rescaled and/or resampled images from the image pyramid. The image pyramid may be, for example, a Gaussian pyramid, a Laplacian pyramid, a steerable pyramid, or a combination thereof. In some examples, rescaling and/or resampling the image can include filtering and/or smoothing the image one or more times after each of the one or more times that the image is downscaled, downsampled, subscaled, and/or subsampled. For instance, include filtering and/or smoothing can include applying a Gaussian filter.

The image segmentation and dynamic object masking engine 290 can perform image segmentation, either on the original image (e.g., as captured by one of the cameras 210 and/or received in the sensor data 265) or a rescaled and/or resampled version of the original image (e.g., a downscaled, downsampled, subscaled, and/or subsampled version of the original image). Image segmentation includes identifying a portion of the image that includes a depiction of the dynamic object. In some examples, the portion of the image that includes the depiction of the dynamic object can be a bounding box around the depiction of the dynamic object. The shape of the bounding box can be square, rectangular, another polygonal shape (occupying a polygonal region of the image), circular, ellipsoidal, ovoid, or a combination thereof. In some examples, the image segmentation identifying the portion of the image that includes the depiction of the dynamic object can be done in a pixel-by-pixel fashion, either using the original image (e.g., as captured by one of the cameras 210 and/or received in the sensor data 265) or a rescaled and/or resampled version of the original image. Use of a downscaled and/or downsampled version of the original image for identifying the portion of the image that includes the depiction of the dynamic object can allow the image segmentation and dynamic object masking engine 290 to identify the portion of the image that includes the depiction of the dynamic object more quickly and efficiently, since the downscaled and/or downsampled version of the original image has fewer pixels that the image segmentation and dynamic object masking engine 290 must analyze. Where a downscaled, downsampled, subscaled, and/or subsampled version of the original image is used for identifying the portion of the image that includes the depiction of the dynamic object, the image segmentation and dynamic object masking engine 290 can upscale and/or upsample either the portion of the image that includes the depiction of the dynamic object, the mask generated based on the portion of the image that includes the depiction of the dynamic object, or both. This upscaling and/or upsampling of the mask and/or of the identified portion of the image that includes the depiction of the dynamic object re-aligns the mask and/or the identified portion of the image that includes the depiction of the dynamic object to the size of the depiction of the dynamic object in the original image.

The image segmentation and dynamic object masking engine 290 can perform dynamic object masking, which includes generating a masked image by masking the portion of the image that includes the depiction of the dynamic object. Masking the portion of the image that includes the depiction of the dynamic object can include generating a mask based on the shape of the identified portion of the image that includes the depiction of the dynamic object. The image segmentation and dynamic object masking engine 290 can then overlay the mask over the image (e.g., the original image or a rescaled and/or resampled version of the original image) so that the mask at least partially (and in some cases entirely) covers the portion of the image that includes the depiction of the dynamic object. The image segmentation and dynamic object masking engine 290 can generate the masked image by merging the mask with the image after overlaying the mask over the image. The image segmentation and dynamic object masking engine 290 outputs modified sensor data 295 to the VIO tracker 215. The modified sensor data 295 may be a modified variant of the sensor data 265. For example, the modified sensor data 295 can include the masked image, and/or one or more additional masked images.

Figure 3:
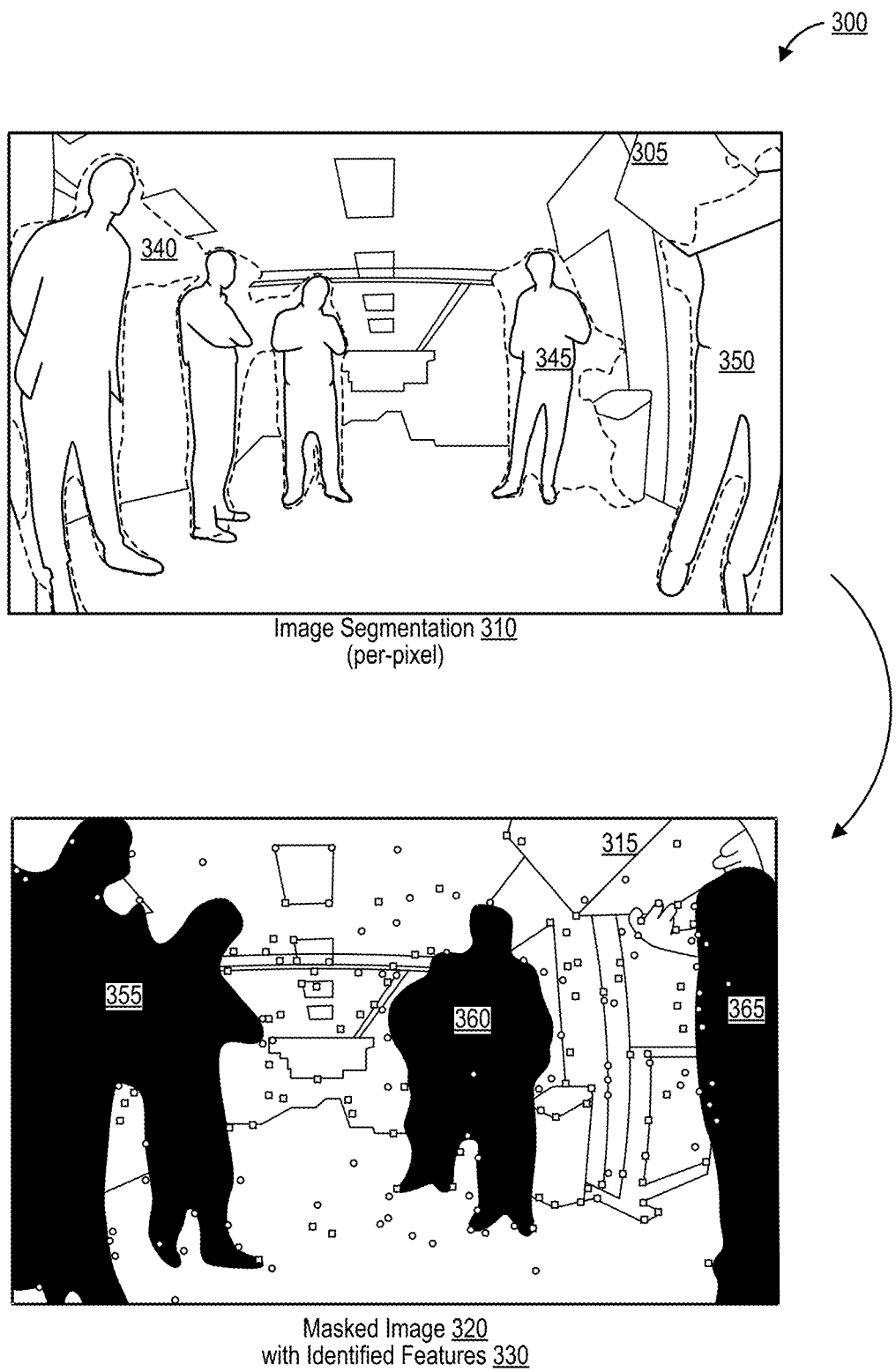
FIG. 3 is a conceptual diagram illustrating examples of image segmentation and masking using a pixel-by-pixel classification of image data.
Figure 4:
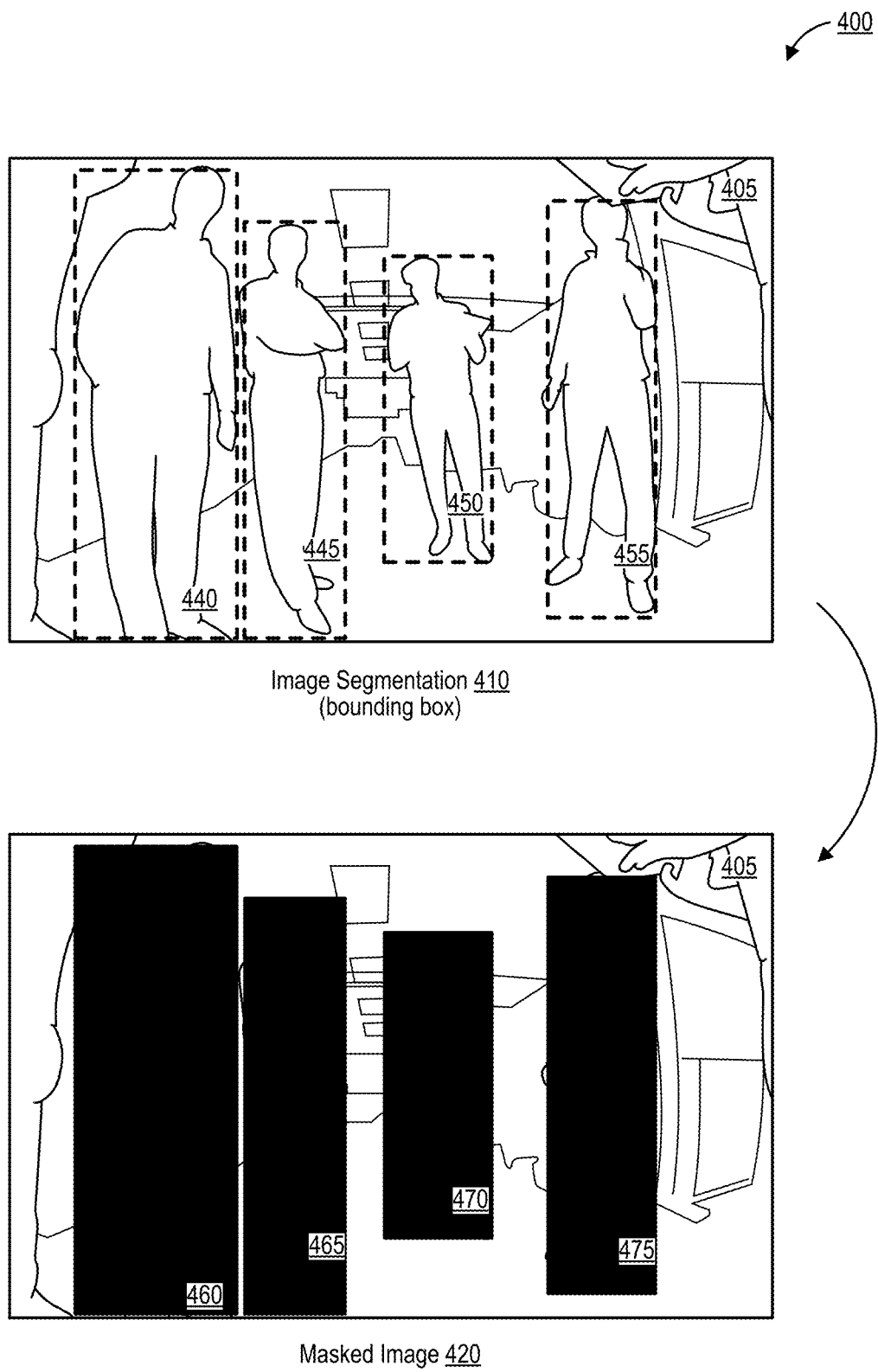
FIG. 4 is a conceptual diagram illustrating examples of image segmentation and masking using bounding boxes for detection of objects within image data.

In some examples, the mask may be filled in with a predetermined opaque color. For example, the mask may be black, white, blue, red, green, yellow, orange, purple, brown, cyan, magenta, or another color. The SLAM device 200B can understand that areas in the masked image filled in the predetermined opaque color corresponding to the mask represent areas within which features are not to be identified and/or tracked in the masked image. For instance, the masks 355, 360, 365, 460, 465, 470, and 475 of FIG. 3 and FIG. 4 are filled in with an opaque black. In some examples, the mask may be filled in with a predetermined pattern. The SLAM device 200B can understand that areas in the masked image filled in the predetermined pattern corresponding to the mask represent areas within which features are not to be identified and/or tracked in the masked image. In some examples, the mask may be a transparency-producing region such that overlaying the mask over a region of the image causes that the region of the image to become transparent. The SLAM device 200B can understand transparent areas in the masked image represent areas within which features are not to be identified and/or tracked in the masked image.

As discussed above, in some examples, a downscaled, downsampled, subscaled, and/or subsampled version of the original image is used for identifying the portion of the image that includes the depiction of the dynamic object. In such examples, the image segmentation and dynamic object masking engine 290 can upscale and/or upsample either the portion of the image, the mask generated based on the portion of the image, or both. This upscaling and/or upsampling of the mask and/or of the identified portion of the image re-aligns the mask and/or the identified portion of the image to the size of the depiction of the dynamic object in the original image. However, this downscaling and/or downsampling and subsequent upscaling and/or upsampling can cause the portion of the image and/or of the mask to include jagged edges. These jagged edges may be included, for example, if nearest neighbor interpolation is used for the upscaling and/or upsampling. To reduce the occurrence of these jagged edges, the image segmentation and dynamic object masking engine 290 can blur, smooth, and/or filter the mask, or at least a portion of the mask that includes the edges of the mask. For example, the image segmentation and dynamic object masking engine 290 can apply a Gaussian filter to the mask before overlaying the mask over the image and merging the overlaid mask with the image to generate the masked image.

Each image of the environment depicts a static portion of the environment and at least one dynamic object in the environment. In some examples, the static portion of the environment can include walls, floors, ceilings, edges joining two or more walls and/or floors and/or ceilings, corners joining two or more walls and/or floors and/or ceilings, doors, doorways, desks, chairs, sofas, couches, rugs, wall art, other pieces of furniture, stationary objects, objects that do not commonly change their pose (e.g., location and/or orientation), objects with unvarying appearances, objects that do not commonly change their appearance, other static objects discussed herein, or combinations thereof. In some examples, the dynamic object can be a location-changing dynamic object whose pose (e.g., location and/or orientation) with respect to the static portions of the environment changes over time, an appearance-changing dynamic object whose appearance changes over time and/or based on the pose of the camera capturing the image, or a combination thereof. In some examples, the dynamic object can be of a person, an animal, a vehicle, a robot, a cloud, a star, a moon, a celestial body, a satellite, a display screen, a computing device, a mirrored surface, a reflective surface, a specular surface, or a combination thereof.

A static portion of the environment may be referred to as a static object, a stationary object, a non-dynamic object, a still object, a stationary portion of the environment, a still portion of the environment, a non-dynamic portion of the environment, or a combination thereof. A static object may refer to an object that does not move and/or does not change appearance. For instance, a static object may refer to an object known to be static and/or stationary, such as a floor, a wall, a ceiling, a building, and/or other static/stationary object. In some cases, a static object may refer to an object that is static and/or stationary (e.g., does not move) relative to objects known to be static and/or stationary, such as a floor, a wall, a building, and/or other static/stationary object. In some cases, such as if an image sensor is not moving between captures of different images (e.g., if the image sensor is an image sensor in a stationary camera), a static object may refer to an object that remains static and/or stationary (e.g., does not move) relative to the position of the image sensor. Regardless of whether the image sensor is moving between captures of different images, a static object may refer to an object that remains static and/or stationary (e.g., does not move) relative to a position of an image sensor during capture of a particular image.

A dynamic object may be referred to as a dynamic portion of the environment, a non-static object, a non-static portion of the environment, a non-stationary object, a non-stationary portion of the environment, a non-still object, a non-still portion of the environment, or a combination thereof. A dynamic object may refer to an object that moves and/or changes appearance over time (e.g., between one image of the environment and another image of the environment). For instance, a dynamic object may refer to an object that moves relative to an object known to be static/stationary, such as the floor, a wall, a ceiling, a building, and/or other static/ stationary object. In some cases, such as if an image sensor is not moving between captures of different images (e.g., if the image sensor is an image sensor in a stationary camera), a dynamic object may refer to an object that moves relative to the position of the image sensor. Regardless of whether the image sensor is moving between captures of different images, a dynamic object may refer to an object that moves relative to a position of an image sensor during capture of a particular image.

In some examples, the modified sensor data 295 can include modified variants of other types of sensor data 265 other than images. The modified variants can be modified to similarly mask out or otherwise remove data corresponding to dynamic objects. For example, the sensor data 265 can include point clouds from a RADAR sensor, a LIDAR sensor, a SONAR sensor, a SODAR sensor, a laser rangefinder, or another distance sensor. The image segmentation and dynamic object masking engine 290 can identify a portion of a point cloud that includes points depicting a dynamic object, such as a person. In some examples, the image segmentation and dynamic object masking engine 290 can identify the portion of a point cloud that includes points depicting the dynamic object based on recognition of the shape of the portion of the point cloud as corresponding to a shape of a recognized type of dynamic object, such as a person or a vehicle. In some examples, the image segmentation and dynamic object masking engine 290 can identify the portion of a point cloud that includes points depicting the dynamic object based on identifying the portion of an image captured by one of the cameras 210 at the same time or within the same time window as capture of the point cloud, and mapping the portion of the image to point cloud based on prior extrinsic calibration between the one of the cameras 210 and the distance sensor. The image segmentation and dynamic object masking engine 290 can generate a modified or "masked" version of the point cloud by removing or deleting at least a subset of the points in the identified portion of a point cloud that includes points depicting the dynamic object. The modified sensor data 295 can include the modified or "masked" version of the point cloud. The modified or "masked" version of the point cloud can, in some examples, be used by the VIO tracker 215, the mapping engine 230, and/or the relocation engine 255 similarly to the masked image.

In some examples, the one or more sensors 205 can also send the sensor data 265, without the modifications of the modified sensor data 295, directly or indirectly to the VIO tracker 215, the mapping engine 230, and/or the relocation engine 255. If any of the VIO tracker 215, the mapping engine 230, and/or the relocation engine 255 encounter an error or artifact (e.g., in feature tracking, mapping, pose estimation, localization, relocation, and/or other operations discussed herein as performed by these portions of the SLAM device 200B) while using the modified sensor data 295, these portions of the SLAM device 200A can try supplementing and/or replacing the modified sensor data 295 with at least a subset of the information in the sensor data 265 to try to fix the error or artifact. For example, in some example images, one or more depictions of one or more dynamic objects may occupy a majority of the area of the image, or more than a threshold percentage of the area of the image. In such images, there may not be sufficient static portions of the image to perform certain operations well. Some example images may include one or more depictions of one or more dynamic objects that are behaving in a largely static manner, such as a human or vehicle that is not moving, or a display screen that is displaying the same output in multiple images. In such images, masking the dynamic objects that are behaving in the largely static manner can lose valuable feature points for tracking. In any of these examples, use of at least some of the one or more depictions of one or more dynamic objects may improve performance for feature tracking, mapping, pose estimation, localization, relocation, and/or other operations discussed herein as performed by these portions of the SLAM device 200B.

FIG. 3 is a conceptual diagram 300 illustrating examples of image segmentation 310 and dynamic object masking using a per-pixel classification of the image data. The per-pixel classification of the image data may be referred to as a pixel-by-pixel classification of image data. In particular, conceptual diagram 300 includes a representation of image segmentation 310 in an image 305. The image 305 depicts a room (e.g., a part of an environment) with five people standing in the room, with the remainder of the room being generally static. The five people represent five dynamic objects depicted in the image 305. The image segmentation and dynamic object masking engine 290 identifies three portions (including a first portion 340, a second portion 345, and a third portion 350) of the image 305 that include dynamic objects, the three portions each outlined using dashed lines. In particular, a first portion 340 of the image 305 includes depictions of three people—a first person, a second person, and a third person. Therefore, the first portion 340 of the image 305 includes depictions of three dynamic objects in the image 305—a first dynamic object, a second dynamic object, and a third dynamic object. A second portion 345 of the image 305 includes a depiction of a fourth person, and therefore includes a depiction of a fourth dynamic object in the image 305. A third portion 350 of the image 305 includes a depiction of a fifth person, and therefore includes a depiction of a fifth dynamic object in the image 305.

The conceptual diagram 300 also includes a representation of a masked image 320 with identified features 330. The masked image 320 is a masked version of an image 315, with three masks (including a first mask 355, a second mask 360, and a third mask 365). The image 315 is similar to, but slightly different from, the image 305. In particular, the image 315 depicts the same room (e.g., and same environment) as the image 305, but with five people—five dynamic objects—standing at different positions in the room than the five people are standing at in the image 305. Numerous identified features 330 identified by the VIO tracker 215 are identified by circle and square shapes overlaid on the masked image 320. The identified features 330 include, for example, various edges and corners in the room. The circles and squares can represent different types of features. The first mask 355, second mask 360, and third mask 365 are filled in with a black opaque color, and are blurred with a Guassian filter to smooth out the edges of the masks 355, 360, and 365. One benefit of blurring out the edges of the masks is, as discussed previously, to make the edges of the masks less jagged. Another benefit of blurring out the edges of the masks is that the VIO tracker 215 generally does not treat the edges of the masks as features, since features are usually best identified at depictions of sharper edges and corners than the blurred edges of the masks 355, 360, and 365. Thus, the identified features 330 overlaid over the masked image 320 generally do not appear at the edges of the masks 355, 360, and 365.

The first mask 355 of the masked image 320 is overlaid over, and therefore masks, a first portion of the image 315 that includes depictions of two people—a first person and a second person. Therefore, the first mask 355 of the masked image 320 is overlaid over, and therefore masks, depictions of two dynamic objects in the image 315—a first dynamic object and a second dynamic object. The second mask 360 of the masked image 320 is overlaid over, and therefore masks, a second portion of the image 315 that includes depictions of two people—a third person and a fourth person. Therefore, the second mask 360 of the masked image 320 is overlaid over, and therefore masks, depictions of two dynamic objects in the image 315—a third dynamic object and a fourth dynamic object. The third mask 365 of the masked image 320 is overlaid over, and therefore masks, a third portion of the image 315 that includes depictions of a fifth person. Therefore, the third mask 365 of the masked image 320 is overlaid over, and therefore masks, a depiction of a fifth dynamic objects in the image 315.

FIG. 4 is a conceptual diagram 400 illustrating examples of image segmentation and masking using bounding boxes for detection of objects within image data. In particular, conceptual diagram 400 includes a representation of image segmentation 410 in an image 405. The image 405 depicts a room (e.g., a part of an environment) with four people standing in the room, with the remainder of the room being generally static. The four people represent four dynamic objects depicted in the image 405. The image segmentation and dynamic object masking engine 290 identifies four portions (including a first portion 440, a second portion 445, a third portion 450, and a fourth portion 455) of the image 405 that include dynamic objects, the four portions each outlined using dashed lines. In particular, a first portion 440 of the image 405 includes a depiction of a first person of the four people, and therefore includes depictions of a first dynamic object in the image 405. A second portion 445 of the image 405 includes a depiction of a second person of the four people, and therefore includes depictions of a second dynamic object in the image 405. A third portion 450 of the image 405 includes a depiction of a third person of the four people, and therefore includes depictions of a third dynamic object in the image 405. A fourth portion 455 of the image 405 includes a depiction of a fourth person of the four people, and therefore includes depictions of a fourth dynamic object in the image 405.

The conceptual diagram 400 also includes a representation of a masked image 420 based on the image segmentation 410 of the image 405. The masked image 420 is a masked version of the image 405, with four masks (including a first mask 460, a second mask 465, a third mask 470, and a fourth mask 475) covering the four portions 440, 445, 450 and 455 of the image identified as including depictions of dynamic objects in the image segmentation 410. In particular, a first mask 460 is overlaid over the first portion 440, a second mask 465 is overlaid over the second portion 445, a third mask 470 is overlaid over the third portion 450, and a fourth mask 475 is overlaid over the fourth portion 455. The masks 460, 465, 470, and 475 are filled in with a black opaque color. While the edges of the masks 460, 465, 470, and 475 are not blurred as illustrated in the masked image 420 of FIG. 4, it should be understood that the edges of the masks 460, 465, 470, and 475 can be blurred. For instance, the edges of the masks 460, 465, 470, and 475 can be blurred using a Gaussian filter similarly to the blurring of the edges of the masks 355, 360, and 365.

Figure 5:
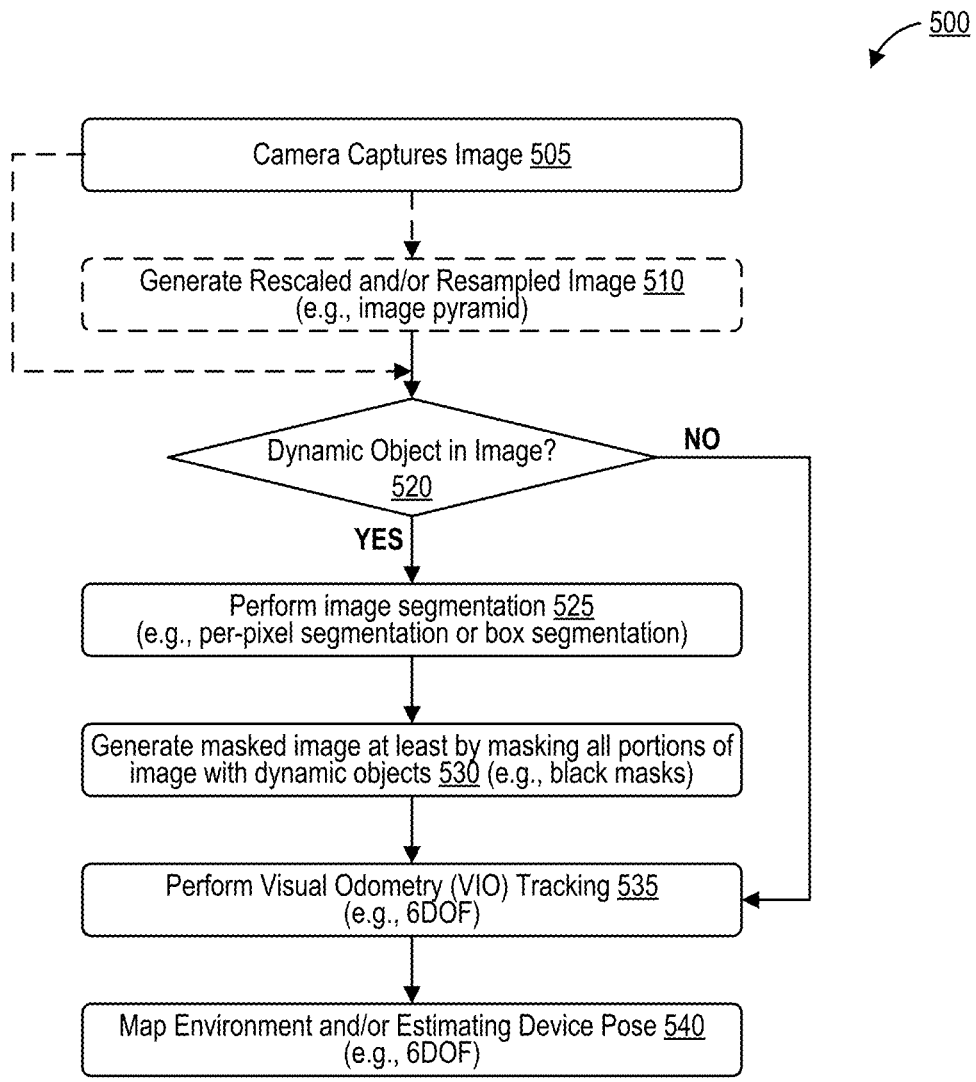
FIG. 5 is a flow diagram illustrating an example flow for performing a visual simultaneous localization and mapping (VSLAM) technique that includes image segmentation, feature tracking, and mapping.

FIG. 5 is a flow diagram illustrating an example of a process 500 for performing a visual simultaneous localization and mapping (VSLAM) technique that includes image segmentation, feature tracking, and mapping. The VSLAM technique illustrated by the process 500 may be performed by a device. The device may be, and/or may include, at least an image capture and processing device 100, an image capture device 105A, an image processing device 105B, a SLAM device 200A, a SLAM device 200B, an unmanned ground vehicle (UGV) 610, an unmanned aerial vehicle (UAV) 620, a head-mounted display (HMD) 710, a mobile device 850, a computing system 1500, any component or element of any of the previously-listed devices, any other type of device or device component mentioned herein, or some combination thereof.

At operation 505, a camera captures an image. The camera may be one of the cameras 210 illustrated in FIG. 2A or FIG. 2B. The camera can be part of the device. The camera can be coupled to the device through one or more wired connections, one or more wireless connections, or a combination thereof. In some examples, the device performs operation 510 after the device performs operation 505. In some examples, the device performs operation 520 after the device performs operation 505.

At operation 510, the device generates a rescaled and/or resampled image. The device generating the rescaled and/or resampled image includes the device rescaling and/or resampling the image captured in operation 505. For instance, the device can generate an image pyramid by downscaling, downsampling, subscaling, and/or subsampling the image one or more times, for instance by generating a multi-scale image pyramid and obtaining one of the rescaled and/or resampled images from the image pyramid. The image pyramid may be, for example, a Gaussian pyramid, a Laplacian pyramid, a steerable pyramid, or a combination thereof. In some examples, rescaling and/or resampling the image can include filtering and/or smoothing the image one or more times after each of the one or more times that the image is downscaled, downsampled, subscaled, and/or subsampled. For instance, include filtering and/or smoothing can include applying a Gaussian filter.

In some cases, the device may process the image at operation 505 and/or at operation 510. For example, a greyscale image may be generated based on the image at least by desaturating color in the image. The device may otherwise modify the image, for example by adjusting brightness in the image, adjusting contrast in the image, adjusting white balance in the image, cropping the image, blurring the image, distorting the image, or a combination thereof.

At operation 520, the device determines whether a dynamic object is depicted in the image. The image within which the device searches for the dynamic object in at operation 520 can be the original image captured at operation 505 or the rescaled and/or resampled image generated at operation 510. If, at operation 520, the device determines that at least one dynamic object is depicted in the image, then the device performs operation 525 after performing operation 520. If, at operation 525, the device determines that the image lacks any depiction of any dynamic object, then the device performs operation 535 after performing operation 520.

At operation 525, the device performs image segmentation. The image segmentation of operation 525 may be referred to as image segmentation. For example, the image segmentation of operation 525 may be include operations performed by the image segmentation and dynamic object masking engine 290 of FIG. 2B, operations performed as part of the image segmentation 310 of FIG. 3, and/or operations performed as part of the image segmentation 410 of FIG. 4. The device can perform the image segmentation of operation 525 either on the original image captured by the camera at operation 505 or on the rescaled and/or resampled image generated at operation 510. The device performing the image segmentation of operation 525 can include the device identifying a portion of the image that includes a depiction of the dynamic object. In some examples, the portion of the image that includes the depiction of the dynamic object can be a bounding box around the depiction of the dynamic object as illustrated in the image segmentation 410 of FIG. 4. In some examples, the image segmentation includes identifying the portion of the image that includes the depiction of the dynamic object can be done in a pixel-by-pixel fashion as illustrated in the image segmentation 310 of FIG. 3. In some examples, the image segmentation includes identifying the portion of the image that includes the depiction of the dynamic object can be done using a hybrid approach, by first identifying the bounding box that includes the depiction of the dynamic object, and then analyzing the portion of the image within the bounding box in a pixel-by-pixel fashion to determine which subset of the pixels in the bounding box include the depiction of the dynamic object.

In some examples, the device uses multiple trained neural networks (NNs) or trained machine learning (ML) models to perform detecting one or more depictions of one or more dynamic objects within the image, and thus to perform image segmentation. For instance, the device can use a first trained NN or ML model to identify whether or not a particular type of dynamic object is present in the image. The first trained NN or ML model can perform, for example, facial detection, facial recognition, facial tracking, object detection, object recognition, object tracking, or a combination thereof. The first trained NN or ML model can receive, as input, either the image or a downscaled or low-resolution variant of the image. If the image is a video frame of a video, the first trained NN or ML model can in some cases receive information regarding one or more video frames that come before or after the video frame in the video, for instance regarding a dynamic object that appears before and after the video frame in the video. The first trained NN or ML model can determine whether or not the image includes a depiction of a dynamic object, or a depiction of a particular category of dynamic object (e.g., humans, vehicles, etc.).

The device can use a second trained NN or ML model if the first trained NN or ML model determines that the particular type of dynamic object is present in the image. The device can use the second trained NN or ML model to identify a bounding box that includes the depiction of the dynamic object. In some examples, the second trained NN or ML model can identify additional instances of dynamic objects that the first trained NN or ML model did not detect. For instance, the first trained NN or ML model can identify that the image includes at least one depiction of a face, and the second trained NN or ML model can identify one or more bounding boxes that include depictions of multiple human beings, vehicles, display screens, and/or other dynamic objects.

The device can use a third trained NN or ML model if the first trained NN or ML model determines that the particular type of dynamic object is present in the image and/or if the second trained NN or ML model identifies one or more bounding boxes including depictions of dynamic objects in the image. The device can use the third trained NN or ML model to determine which specific subset of the pixels in the image depict the dynamic object(s). In some examples, the third trained NN or ML model can analyze each pixel in the image to determine the subset of the pixels in the image that depict the dynamic object(s). For instance, the third trained NN or ML model can receive the image (or a downscaled version of the image) as its input. In some examples, the third trained NN or ML model can analyze each pixel in the one or more bounding boxes identified by the second trained NN or ML model to determine the subset of the pixels in the one or more bounding boxes that depict the dynamic object (s). For instance, the third trained NN or ML model can receive the pixels in the one or more bounding boxes (or a downscaled version thereof) as its input. In some examples, the trained NNs or ML models can be tuned to output fewer false positives than true positives. In some examples, the trained NNs or ML models can be tuned for temporal consistency.

Because detecting bounding boxes and analyzing each pixel using a pixel-by-pixel approach can both be more time-intensive, processor-intensive, power-intensive, and otherwise resource-intensive than identifying whether the image includes any depiction of a dynamic object, using the first trained NN or ML model as the first pass can save time, processing bandwidth, power, and other resources. Because analyzing each pixel using a pixel-by-pixel approach can be more time-intensive, processor-intensive, power-intensive, and otherwise resource-intensive than detecting bounding boxes, using the second trained NN or ML model before using the third trained NN or ML model as the first pass can save time, processing bandwidth, power, and other resources.

In some examples, the first NN or ML model and the second NN or ML model described above can be a single NN or ML model. In some examples, the second NN or ML model and the third NN or ML model described above can be a single NN or ML model. In some examples, the first NN or ML model, the second NN or ML model, and the third NN or ML model described above can be a single NN or ML model.

At operation 530, the device generates a masked image at least by masking all of the portions of the image identified at operation 525 as including depictions of one or more dynamic objects. Masking the portion of the image that includes the depiction of the dynamic object can include generating a mask based on the shape of the identified portion of the image that includes the depiction of the dynamic object. The mask may be filled-in with a predetermined color, a predetermined pattern, a predetermined transparency value (e.g., alpha value), or another predetermined value. The image segmentation and dynamic object masking engine 290 can then overlay the mask over the image (e.g., the original image or a rescaled and/or resampled version of the original image) so that the mask at least partially (and in some cases entirely) covers the portion of the image that includes the depiction of the dynamic object. The image segmentation and dynamic object masking engine 290 can generate the masked image by merging the mask with the image after overlaying the mask over the image. In some examples, the mask may be black. In some examples, the mask may be blurred, filtered, and/or smoothed (e.g., using a Gaussian filter) before the mask is overlaid over the image and/or before the mask is merged with the image to generate the masked image. In some examples, the mask may be increased in size compared to the portion of the image that includes the depiction of the dynamic object, for instance by adding a stroke around the mask of a predetermined thickness (e.g., 1 pixel, 2 pixels, 3 pixels, 4 pixels, 5, pixels, 6 pixels, 7 pixels, 8 pixels, 9 pixels, 10 pixels, more than 10 pixels, or a number of pixels in between an previously listed number). The mask, after increasing its size, is slightly larger than the portion of the image that includes the depiction of the dynamic object. By using a mask that is slightly larger than the portion of the image that includes the depiction of the dynamic object, the device can avoid identifying and/or tracking features tracking that are depicted at the boundaries of the depiction of the dynamic object, which might otherwise be erroneous or false positives, as they may include a portion of the depiction of the dynamic object that was not detected by the device (e.g, hair). In some examples, overlaying the mask over the image and merging the mask with the image changes a transparency value (e.g., alpha value) at the portion of the image that includes the depiction of the dynamic object in the masked image.

In some examples, the downscaled, downsampled, subscaled, and/or subsampled version of the original image generated in operation 510 is used for the dynamic object detection of operation 520, the image segmentation of operation 525, the masking of operation 530, or a combination thereof. In such examples, the device can upscale and/or upsample either the portion of the image that includes the depiction of the dynamic object identified in the image segmentation of operation 525, the mask generated based on the portion of the image that includes the depiction of the dynamic object in the masking of operation 530, or both. This upscaling and/or upsampling of the mask and/or of the identified portion of the image that includes the depiction of the dynamic object re-aligns the mask and/or the identified portion of the image that includes the depiction of the dynamic object to the size of the depiction of the dynamic object in the original image. In some examples, the device can upscale and/or upsample of the mask and/or of the identified portion of the image to a larger size that is larger than the size of the depiction of the dynamic object in the original image, for example by a factor of 1%, 2%, 3%, 4%, 5%, 6%, 7%, 8%, 9%, 10%, a percentage value greater than 10%, a percentage value between 0% and 1%, or a percentage value between any two of the listed percentage values. This upscaling and/or upsampling to the larger size causes the mask to mask some additional area around the portion of the image that includes the depiction of the dynamic object, which may end up masking portions of the depiction of the dynamic object that were incorrectly omitted from the portion of the image that includes the depiction of the dynamic object as classified by the image segmentation of operation 525.

In some cases, for example if the image is a video frame of a video, the device can examine the one or more previous video frames of video and use one or more portions of the one or more previous video frames that were previously identified as depicting one or more dynamic objects (and/or the corresponding masks) as predictors for one or more portions of the current frame that depict one or more dynamic objects.

At operation 535, the device performs VIO tracking. If the device detected at least one dynamic object in the image at operation 520, then at operation 535, the device performs VIO tracking using the masked image generated at operation 530. If the device detected no dynamic objects in the image at operation 520, then at operation 535, the device performs VIO tracking using either the original image captured at operation 505 or the rescaled and/or resampled image generated at operation 510. The VIO tracking of operation 535 may include any operations discussed herein with as being performed by the VIO tracker 215, the feature tracking engine 220, the sensor integration engine 225, or a combination thereof. For instance, the VIO tracking of operation 535 may include identifying features in the masked image (or non-masked image if operation 530 was skipped), tracking features in the masked image (or non-masked image if operation 530 was skipped), identifying or updating a 3D feature position for the features in the masked image (or non-masked image if operation 530 was skipped), identifying a keyframe corresponding to the features in the masked image (or non-masked image if operation 530 was skipped), or a combination thereof. The VIO tracking of operation 535 can be performed based on three degrees of freedom (3DOF), six degrees of freedom (6DOF), or another number of degrees of freedom.

At operation 540, the device performs mapping of the environment and/or estimating of the device pose of the device. The device can perform the mapping of the environment and/or estimating of the device pose of operation 540 based on the feature identification, tracking, positioning, and/or keyframing of operation 535. The mapping of the environment and/or estimating of the device pose of operation 540 can include any operations discussed herein with as being performed by the VIO tracker 215, the feature tracking engine 220, the sensor integration engine 225, the mapping engine 230, the map densification engine 235, the keyframe remover 240, the bundle adjuster 245, the relocation engine 255, the extraction and matching engine 260, or a combination thereof. The mapping of the environment and/or estimating of the device pose of operation 540 can be performed based on three degrees of freedom (3DOF), six degrees of freedom (6DOF), or another number of degrees of freedom.

Figure 9:
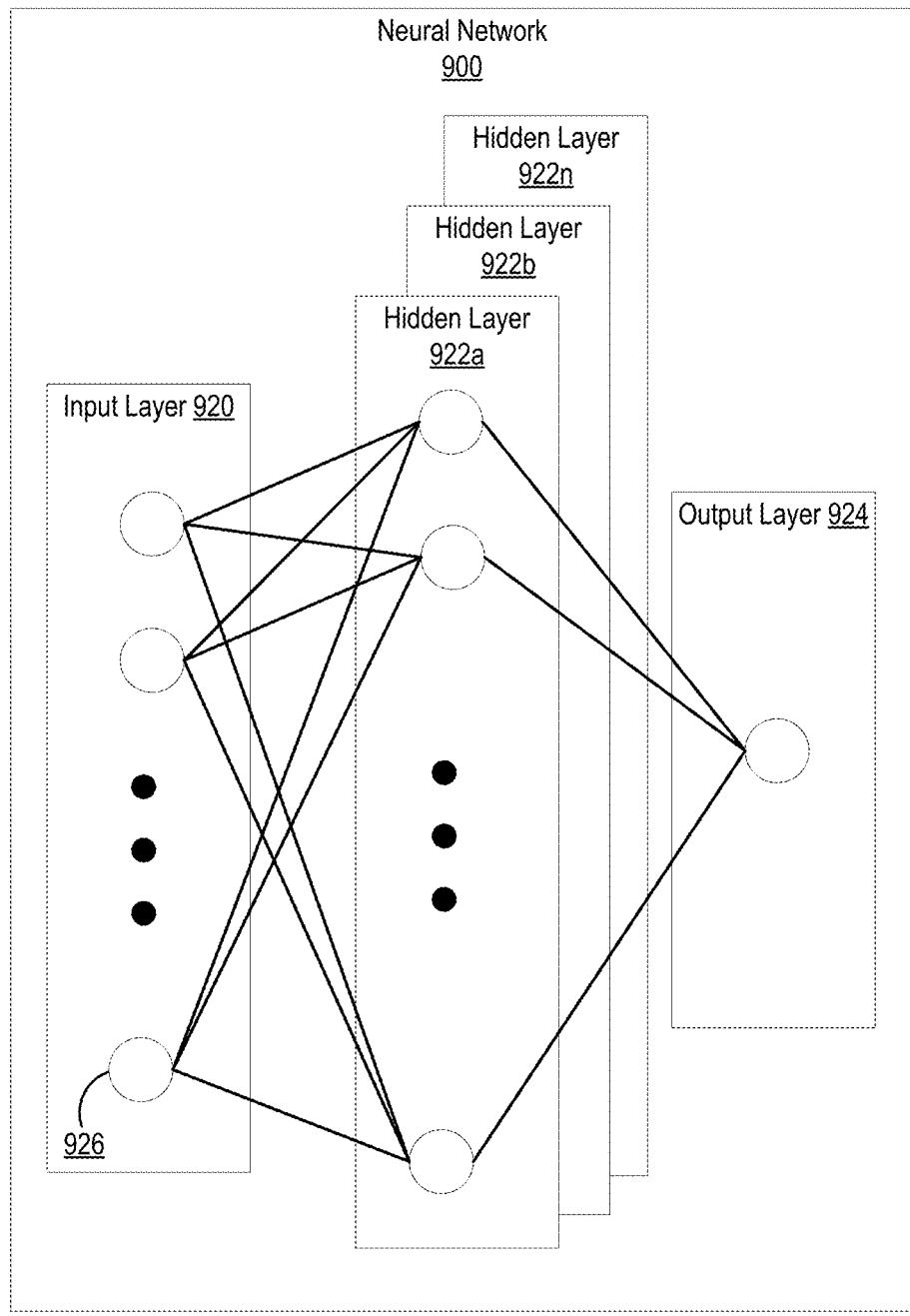
FIG. 9 is a block diagram illustrating an example of a neural network, in accordance with some examples.
Figure 10:
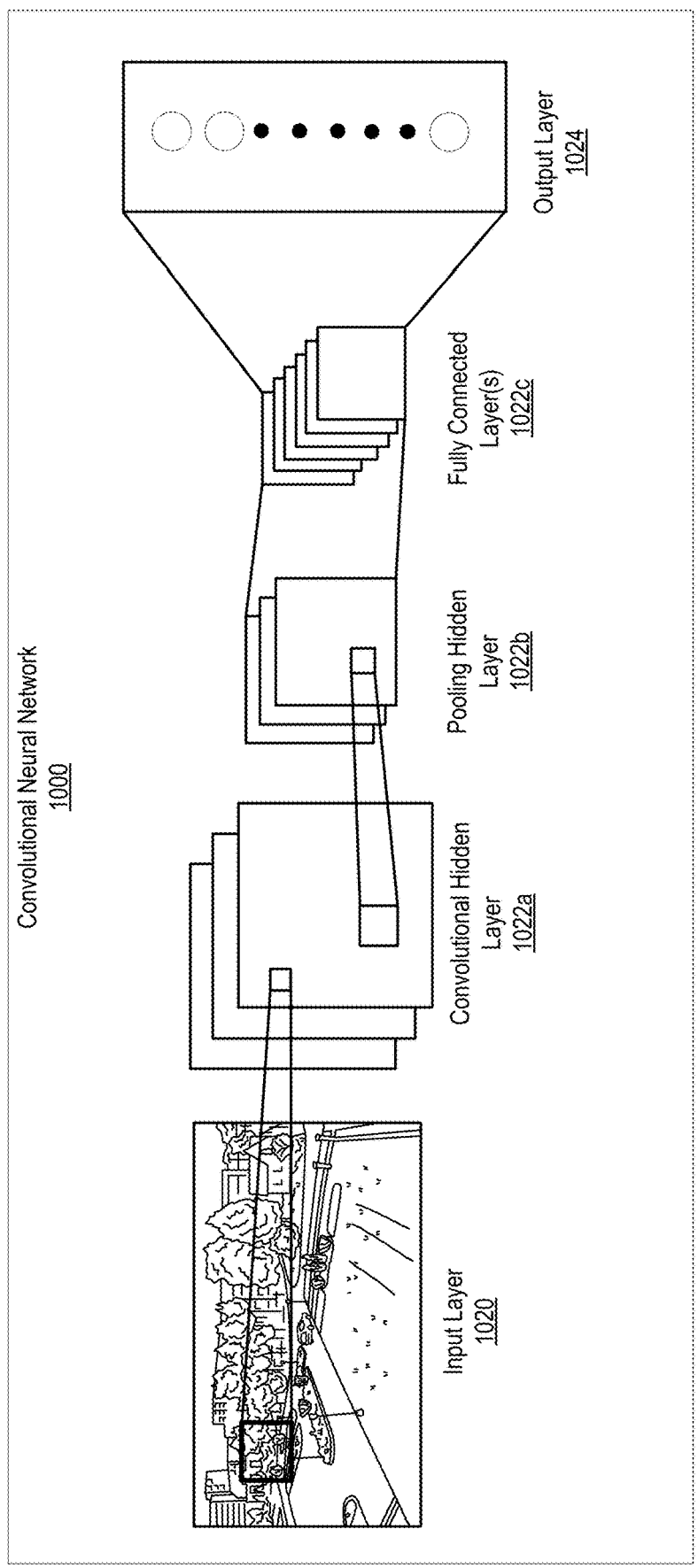
FIG. 10 is a block diagram illustrating an example of a convolutional neural network (CNN), in accordance with some examples.
Figure 11:
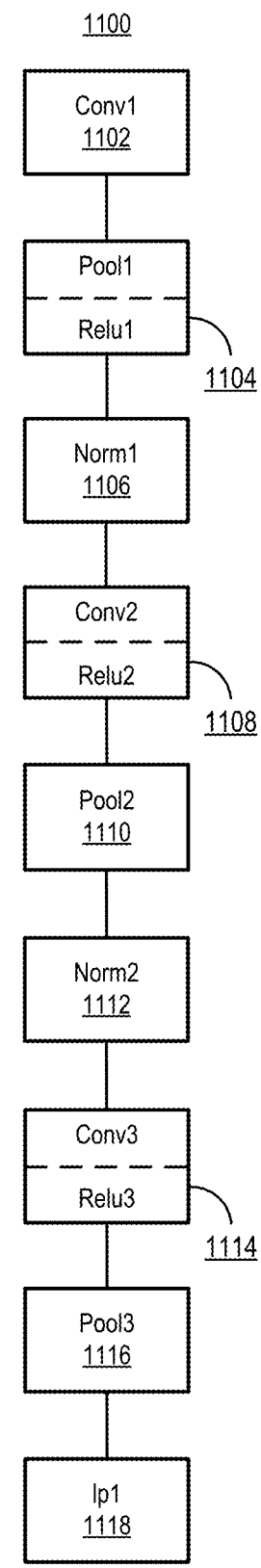
FIG. 11 is a diagram illustrating an example of the Cifar-10 neural network, in accordance with some examples.

In some cases, the device performs at least a subset of the operations 505, 510, 520, 525, 530, 535, and 540 with the assistance of an intelligence engine. The intelligence engine may include, for example, one or more artificial intelligence algorithms, one or more machine learning models trained using training data input into one or more machine learning algorithms, one or more neural networks, or a combination thereof. The device can input data into the intelligence engine and receive processed data from the intelligence engine. The intelligence engine may be run at least in part on the device, may be run at least in part on a separate device (e.g., a remote server), or a combination thereof. Where the intelligence engine is run at least at least in part on the separate device, the device can send data, such as the image, to the separate device, and can receive the processed data from the remote server. The intelligence engine can perform, for example, at least a portion of operation 510, at least a portion of operation 520, at least a portion of operation 525, at least a portion of operation 530, at least a portion of operation 535, at least a portion of operation 540, or a combination thereof. The processed data output by the intelligence engine can include, for example, the rescaled and/or resampled image generated at operation 510, the determination of whether the image includes at least one dynamic object of operation 520, the portion of the image that includes a depiction of a dynamic object determined using the image segmentation operation 525, the mask and/or masked image generated using the masking operation 530, an identification of the features in the image. Examples of the intelligence engine are illustrated at FIG. 9, FIG. 10, and FIG. 11.

For example, at operation 520, the intelligence engine can determine whether at least one dynamic object is present in the image based on whether the intelligence engine detects a face, a human body, an animal body, a vehicle, a mirror, a display screen, a specular surface, or another type of dynamic object in the image. Detection of a face can be performed, for example, using facial detection and/or facial recognition. Detection of one of the above types of object can be performed, for example, using object detection, object recognition, and/or object classification. At operation 525, the intelligence engine can identify a bounding box within which a depiction of a dynamic object is included as discussed with respect to FIGS. 12A-12C and/or FIGS. 13A-13C. At operation 525, the intelligence engine can identify, for each pixel of the image (or each pixel in a bounding box), whether the pixel depicts part of a dynamic object, in some cases by also taking into account neighboring pixels. At operation 535, the intelligence engine can select a strength of a blurring or filtering of a mask depending on the size and resolution of the image, the size of the mask, the shape of the mask, and other factors. At operation 540, the intelligence engine can identify a feature in the current image, recognize that the feature matches a previously-identified feature in a second image, track the movement of the feature between the second image and the current image, determine or update the 3D feature position of the feature, determine a keyframe for the feature. At operation 540, the intelligence engine can generate and/or update the map of the environment based on the feature tracking, on one or more 3D feature positions and/or on one or more keyframes. At operation 540, the intelligence engine can perform map densification, keyframe removal or addition, bundle adjustment, and/or loop closure detection. At operation 540, the intelligence engine can generate and/or update a pose 285 of the device based on the feature tracking, on one or more 3D feature positions and/or on one or more keyframes.

In some cases, the identification of the portions of the image that include depictions of dynamic objects may be used for additional purposes. For example, the device may apply additional image processing to the portions of the image that include depictions of dynamic objects, for example to reduce motion blur of moving objects. The device may apply facial recognition or object recognition to detect who, and what types of objects, are present in the environment in the portions of the image that include depictions of dynamic objects. For augmented or mixed reality, the device may generate virtual objects and realistically have the virtual objects be partially occluded by dynamic objects in the scene. For example, the device may generate a virtual butterfly and display the virtual butterfly flying about the environment, and may use the detection of the portions of the image that include depictions of dynamic objects to at least partially occlude the virtual butterfly so that the virtual butterfly can realistically appear to fly behind people and other dynamic objects in the scene.

Some applications, such as augmented reality, mixed reality, or extended reality, run at least at 30 frames per second (FPS), requiring fast operation. For example, at least the image capture and analysis portions of the VSLAM technique illustrated in the flow diagram of FIG. 5 may need to occur within 33 milliseconds. Use of a neural network or other intelligence engine for certain complex operations, such as 520 and 525, can allow the VSLAM technique illustrated in FIG. 5 to occur within this time. Nonetheless, certain techniques may be used to determine certain image frames in which some of these operations may be skipped to improve performance further. For example, sensors 205 of the device may be used by the device to determine if the device is currently moving or rotating. If the device is currently moving or rotating, every frame is captured and analyzed as normal. If the device is currently stationary (e.g., not moving or rotating), then operations 520 and 525 (and optionally operations 510 and/or 530) can be performed for every other frame. A frame for which operations 520 and 525 are skipped can use the mask from the previous frame, since the photographed portion of the environment is unlikely to have significantly changed between the two frames due to the lack of movement of the device. In some cases, the intelligence engine can use prediction to adjust the masks slightly from the previous frame.

Figure 6A:
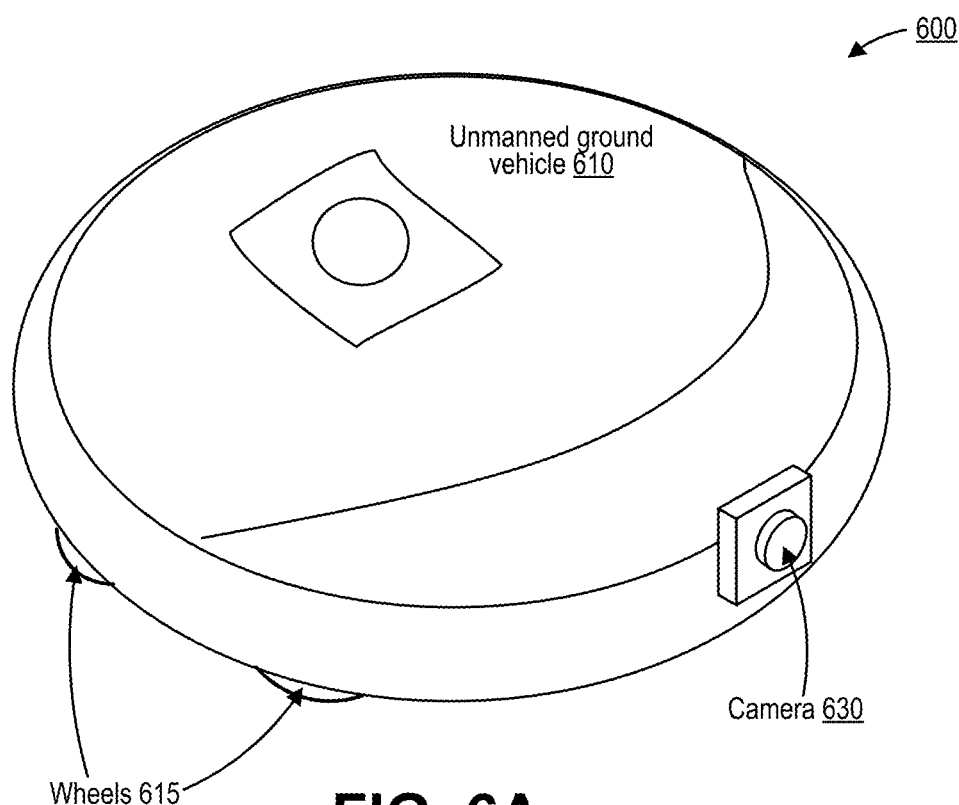
FIG. 6A is a perspective diagram illustrating an unmanned ground vehicle (UGV) that performs visual simultaneous localization and mapping (VSLAM), in accordance with some examples.

FIG. 6A is a perspective diagram 600 illustrating an unmanned ground vehicle (UGV) 610 that performs visual simultaneous localization and mapping (VSLAM), in accordance with some examples. The UGV 610 illustrated in the perspective diagram 600 of FIG. 6A may be an example of a SLAM device 200A and/or SLAM device 200B that performs the VSLAM technique illustrated in FIG. 5 and/or the image processing technique illustrated in FIG. 14. The UGV 610 includes a camera 630 along a front surface of the UGV 610. The camera 630 may be one of the one or more cameras 210. In some examples, the UGV 610 may include one or more additional cameras in addition to the camera 630. In some examples, the UGV 610 may include one or more additional sensors in addition to the camera 630. The UGV 610 includes multiple wheels 615 along a bottom surface of the UGV 610. The wheels 615 may act as a conveyance of the UGV 610, and may be motorized using one or more motors that may be actuated by a movement actuator of the UGV 610. The movement actuator, the motors, and thus the wheels 615, may be actuated to move the UGV 610 along a path.

Figure 6B:
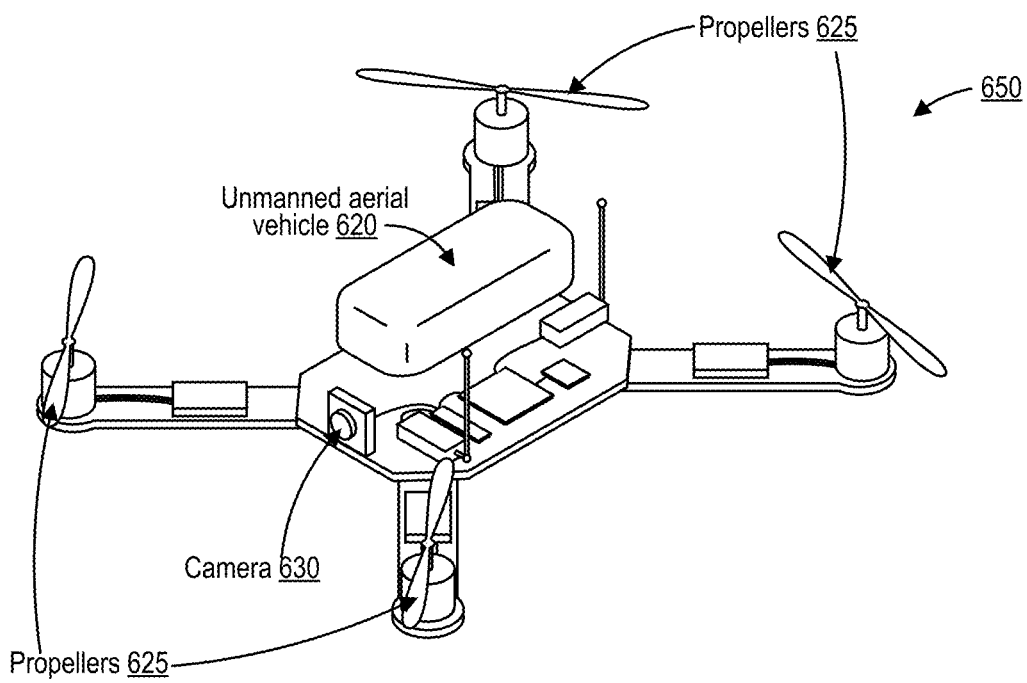
FIG. 6B is a perspective diagram illustrating an unmanned aerial vehicle (UAV) that performs visual simultaneous localization and mapping (VSLAM), in accordance with some examples.

FIG. 6B is a perspective diagram 650 illustrating an unmanned aerial vehicle (UAV) 620 that performs visual simultaneous localization and mapping (VSLAM), in accordance with some examples. The UAV 620 illustrated in the perspective diagram 650 of FIG. 6B may be an example of a SLAM device 200A and/or SLAM device 200B that performs the VSLAM technique illustrated in FIG. 5 and/or the image processing technique illustrated in FIG. 14. The UAV 620 includes a camera 630 along a front portion of a body of the UAV 620. The camera 630 may be one of the one or more cameras 210. In some examples, the UAV 620 may include one or more additional cameras in addition to the camera 630. In some examples, the UAV 620 may include one or more additional sensors in addition to the camera 630. The UAV 620 includes multiple propellers 625 along the top of the UAV 620. The propellers 625 may be spaced apart from the body of the UAV 620 by one or more appendages to prevent the propellers 625 from snagging on circuitry on the body of the UAV 620 and/or to prevent the propellers 625 from occluding the view of the camera 630. The propellers 625 may act as a conveyance of the UAV 620, and may be motorized using one or more motors that may be actuated by a movement actuator of the UAV 620. The movement actuator, the motors, and thus the propellers 625, may be actuated to move the UAV 620 along a path.

Where the SLAM device 200A or SLAM device 200B is a vehicle, such as the UGV 610 or UAV 620, the SLAM device 200A and/or SLAM device 200B may include a path planning engine and/or a movement actuator. The path planning engine may generate a path along which the SLAM device 200A or SLAM device 200B is to move. In some examples, path planning engine may use a Dijkstra algorithm to plan the path. In some examples, the path planning engine may include stationary obstacle avoidance and/or moving obstacle avoidance in planning the path. In some examples, the path planning engine may include determinations as to how to best move the SLAM device 200A or SLAM device 200B from a first pose to a second pose in planning the path. In some examples, the path planning engine may plan a path that is optimized to reach and observe every portion of a first region of an environment (e.g., a first set of one or more rooms in the environment) before moving on to a second region of the environment (e.g., the second set of one or more rooms of the environment) in planning the path. In some examples, the path planning engine may plan a path that is optimized to reach and observe a predetermined set of rooms in an environment (e.g., every room in the environment) as quickly as possible. In some examples, the path planning engine may plan a path that returns to a previously-observed room to observe a particular feature again to improve one or more map points corresponding the feature in the local map and/or global map. In some examples, the path planning engine may plan a path that returns to a previously-observed room to observe a portion of the previously-observed room that lacks map points in the local map and/or global map to see if any features can be observed in that portion of the room. The movement actuator may actuate one or more motors to actuate a motorized conveyance (e.g., the wheels 615 or the propellers 625) to move the SLAM device 200A or SLAM device 200B along the path planned by the path planning engine.

In some cases, the propellers 625 of the UAV 620, or another portion of a SLAM device 200A and/or SLAM device 200B (e.g., an antenna), may partially occlude the view of one of the one or more cameras 210 in some images captured by the one or more cameras 210. In some examples, this partial occlusion may be masked out of any images in which the partial occlusion appears, for example as in the masking operation 530.

Figure 7A:
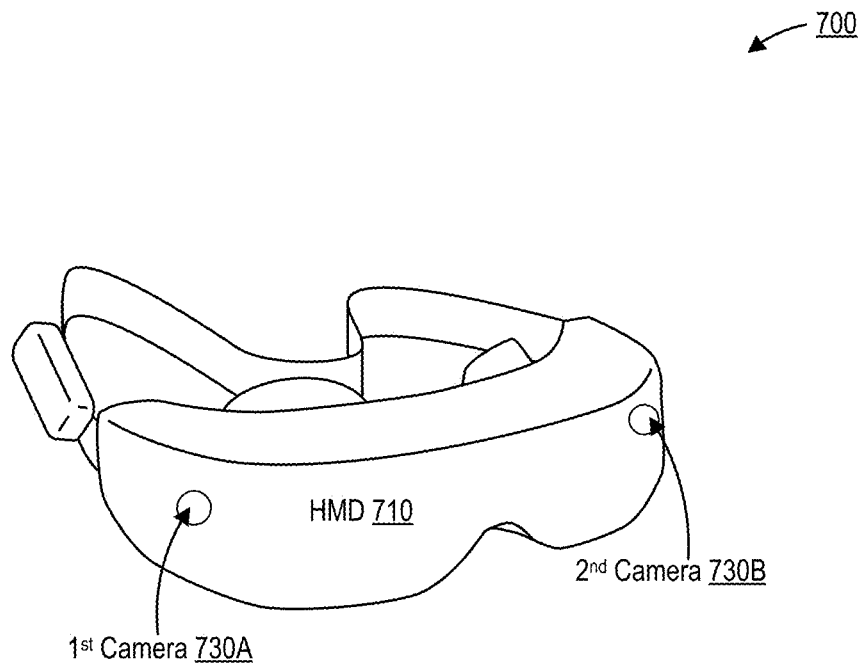
FIG. 7A is a perspective diagram illustrating a head-mounted display (HMD) that performs visual simultaneous localization and mapping (VSLAM), in accordance with some examples.

FIG. 7A is a perspective diagram 700 illustrating a head-mounted display (HMD) 710 that performs visual simultaneous localization and mapping (VSLAM), in accordance with some examples. The HMD 710 may be, for example, an augmented reality (AR) headset, a virtual reality (VR) headset, a mixed reality (MR) headset, an extended reality (XR) headset, or some combination thereof. The HMD 710 illustrated in the perspective diagram 700 of FIG. 7A may be an example of a SLAM device 200A and/or SLAM device 200B that performs the VSLAM technique illustrated in FIG. 5 and/or the image processing technique illustrated in FIG. 14. The HMD 710 includes a first camera 730A and a second camera 730B along a front portion of the HMD 710. The first camera 730A and the second camera 730B may be two of the one or more cameras 210. In some examples, the HMD 710 may only have a single camera. In some examples, the HMD 710 may include one or more additional cameras in addition to the first camera 730A and the second camera 730B. In some examples, the HMD 710 may include one or more additional sensors in addition to the first camera 730A and the second camera 730B.

Figure 7B:
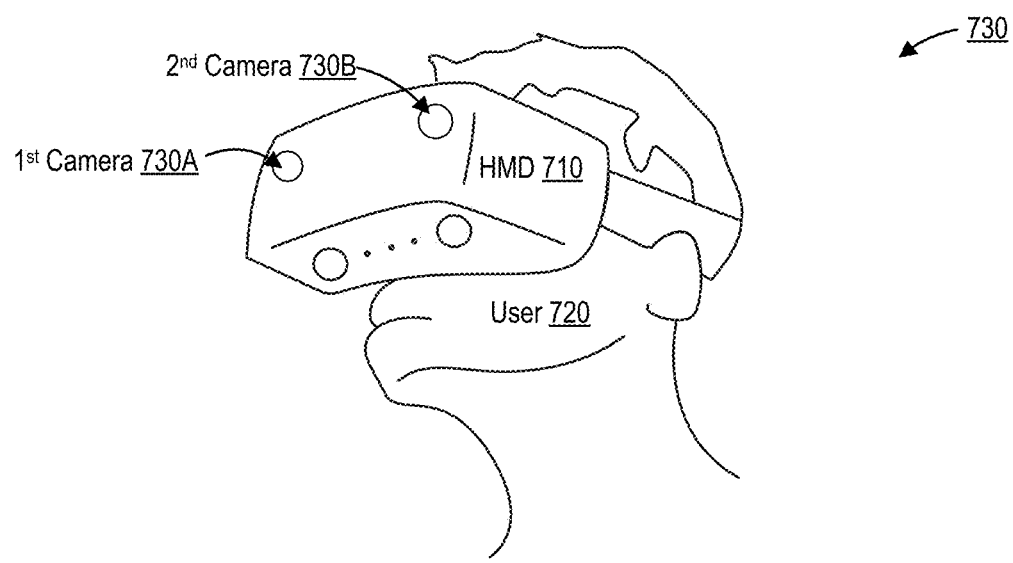
FIG. 7B is a perspective diagram illustrating the head-mounted display (HMD) of FIG. 7A being worn by a user, in accordance with some examples.

FIG. 7B is a perspective diagram 730 illustrating the head-mounted display (HMD) 710 of FIG. 7A being worn by a user 720, in accordance with some examples. The user 720 wears the HMD 710 on the user 720's head over the user 720's eyes. The HMD 710 can capture images with the first camera 730A and the second camera 730B. In some examples, the HMD 710 displays one or more display images toward the user 720's eyes that are based on the images captured by the first camera 730A and the second camera 730B. The display images may provide a stereoscopic view of the environment, in some cases with information overlaid and/or with other modifications. For example, the HMD 710 can display a first display image to the user 720's right eye, the first display image based on an image captured by the first camera 730A. The HMD 710 can display a second display image to the user 720's left eye, the second display image based on an image captured by the second camera 730B. For instance, the HMD 710 may provide overlaid information in the display images overlaid over the images captured by the first camera 730A and the second camera 730B.

The HMD 710 includes no wheels 615, propellers 625, or other conveyance of its own. Instead, the HMD 710 relies on the movements of the user 720 to move the HMD 710 about the environment. Thus, in some cases, the HMD 710, when performing a VSLAM technique, can skip path planning using the path planning engine and/or movement actuation using the movement actuator. In some cases, the HMD 710 can still perform path planning using the path planning engine, and can indicate directions to follow a suggested path to the user 720 to direct the user along the suggested path planned using the path planning engine. In some cases, for instance where the HMD 710 is a VR headset, the environment may be entirely or partially virtual. If the environment is at least partially virtual, then movement through the virtual environment may be virtual as well. For instance, movement through the virtual environment can be controlled by one or more joysticks, buttons, video game controllers, mice, keyboards, trackpads, and/or other input devices. The movement actuator may include any such input device. Movement through the virtual environment may not require wheels 615, propellers 625, legs, or any other form of conveyance. If the environment is a virtual environment, then the HMD 710 can still perform path planning using the path planning engine and/or movement actuation. If the environment is a virtual environment, the HMD 710 can perform movement actuation using the movement actuator by performing a virtual movement within the virtual environment. Even if an environment is virtual, VSLAM techniques may still be valuable, as the virtual environment can be unmapped and/or generated by a device other than the SLAM device 200A and/or SLAM device 200B, such as a remote server or console associated with a video game or video game platform. In some cases, VSLAM may be performed in a virtual environment even by a SLAM device 200A and/or SLAM device 200B that has its own physical conveyance system that allows it to physically move about a physical environment. For example, VSLAM may be performed in a virtual environment to test whether a SLAM device 200A and/or SLAM device 200B is working properly without wasting time or energy on movement and without wearing out a physical conveyance system of the SLAM device 200A and/or SLAM device 200B.

Figure 8A:
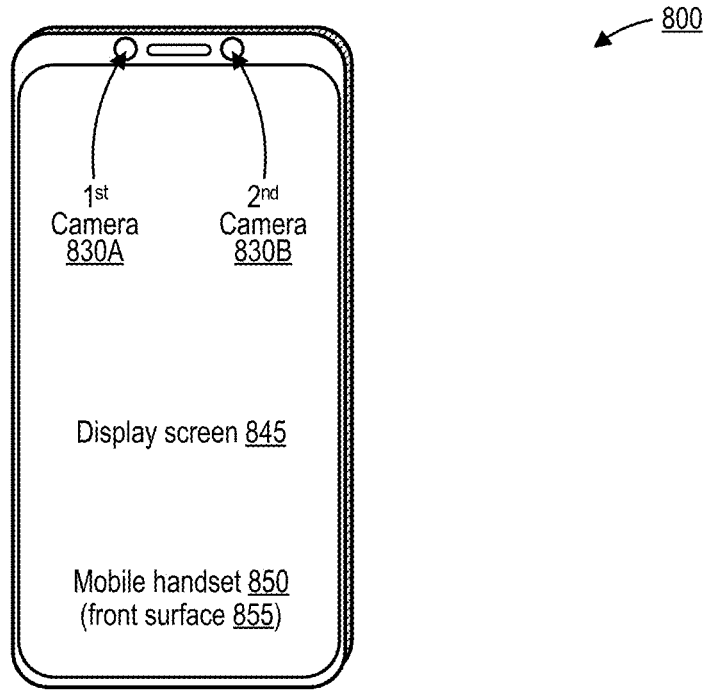
FIG. 8A is a perspective diagram illustrating a front surface of a mobile handset that performs visual simultaneous localization and mapping (VSLAM) using one or more front-facing cameras, in accordance with some examples.

FIG. 8A is a perspective diagram 800 illustrating a front surface 855 of a mobile device 850 that performs visual simultaneous localization and mapping (VSLAM) using one or more front-facing cameras 830A-B, in accordance with some examples. The mobile device 850 may be, for example, a cellular telephone, a satellite phone, a portable gaming console, a music player, a health tracking device, a wearable device, a wireless communication device, a laptop, a mobile device, any other type of computing device or computing system discussed herein, or a combination thereof. The front surface 855 of the mobile device 850 includes a display screen 845. The front surface 855 of the mobile device 850 includes a first camera 830A and a second camera 830B. The first camera 830A and the second camera 830B are illustrated in a bezel around the display screen 845 on the front surface 855 of the mobile device 850. In some examples, the first camera 830A and the second camera 830B can be positioned in a notch or cutout that is cut out from the display screen 845 on the front surface 855 of the mobile device 850. In some examples, the first camera 830A and the second camera 830B can be under-display cameras that are positioned between the display screen 845 and the rest of the mobile device 850, so that light passes through a portion of the display screen 845 before reaching the first camera 830A and the second camera 830B. The first camera 830A and the second camera 830B of the perspective diagram 840 are front-facing cameras. The first camera 830A and the second camera 830B face a direction perpendicular to a planar surface of the front surface 855 of the mobile device 850. The first camera 830A and the second camera 830B may be two of the one or more cameras 210. In some examples, the front surface 855 of the mobile device 850 may only have a single camera. In some examples, the mobile device 850 may include one or more additional cameras in addition to the first camera 830A and the second camera 830B. In some examples, the mobile device 850 may include one or more additional sensors in addition to the first camera 830A and the second camera 830B.

Figure 8B:
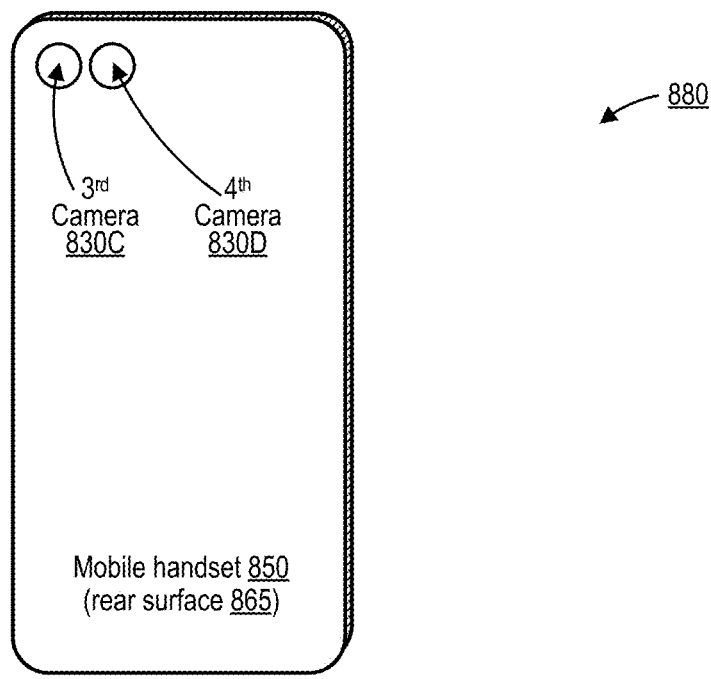
FIG. 8B is a perspective diagram illustrating a rear surface of a mobile handset that performs visual simultaneous localization and mapping (VSLAM) using one or more rear-facing cameras, in accordance with some examples.

FIG. 8B is a perspective diagram 880 illustrating a rear surface 865 of a mobile device 850 that performs visual simultaneous localization and mapping (VSLAM) using one or more rear-facing cameras 830C-D, in accordance with some examples. The mobile device 850 includes a third camera 830C and a fourth camera 830D on the rear surface 865 of the mobile device 850. The third camera 830C and the fourth camera 830D of the perspective diagram 880 are rear-facing. The third camera 830C and the fourth camera 830D face a direction perpendicular to a planar surface of the rear surface 865 of the mobile device 850. While the rear surface 865 of the mobile device 850 does not have a display screen 845 as illustrated in the perspective diagram 880, in some examples, the rear surface 865 of the mobile device 850 may have a second display screen. If the rear surface 865 of the mobile device 850 has a display screen 845, any positioning of the third camera 830C and the fourth camera 830D relative to the display screen 845 may be used as discussed with respect to the first camera 830A and the second camera 830B at the front surface 855 of the mobile device 850. The third camera 830C and the fourth camera 830D may be two of the one or more cameras 210. In some examples, the rear surface 865 of the mobile device 850 may only have a single camera. In some examples, the mobile device 850 may include one or more additional cameras in addition to the first camera 830A, the second camera 830B, the third camera 830C, and the fourth camera 830D. In some examples, the mobile device 850 may include one or more additional sensors in addition to the first camera 830A, the second camera 830B, the third camera 830C, and the fourth camera 830D.

Like the HMD 710, the mobile device 850 includes no wheels 615, propellers 625, or other conveyance of its own. Instead, the mobile device 850 relies on the movements of a user holding or wearing the mobile device 850 to move the mobile device 850 about the environment. Thus, in some cases, the mobile device 850, when performing a VSLAM technique, can skip path planning using the path planning engine and/or movement actuation using the movement actuator. In some cases, the mobile device 850 can still perform path planning using the path planning engine, and can indicate directions to follow a suggested path to the user to direct the user along the suggested path planned using the path planning engine. In some cases, for instance where the mobile device 850 is used for AR, VR, MR, or XR, the environment may be entirely or partially virtual. In some cases, the mobile device 850 may be slotted into a head-mounted device so that the mobile device 850 functions as a display of HMD 710, with the display screen 845 of the mobile device 850 functioning as the display of the HMD 710. If the environment is at least partially virtual, then movement through the virtual environment may be virtual as well. For instance, movement through the virtual environment can be controlled by one or more joysticks, buttons, video game controllers, mice, keyboards, trackpads, and/or other input devices that are coupled in a wired or wireless fashion to the mobile device 850. The movement actuator may include any such input device. Movement through the virtual environment may not require wheels 615, propellers 625, legs, or any other form of conveyance. If the environment is a virtual environment, then the mobile device 850 can still perform path planning using the path planning engine and/or movement actuation. If the environment is a virtual environment, the mobile device 850 can perform movement actuation using the movement actuator by performing a virtual movement within the virtual environment.

FIG. 9 is a block diagram illustrating an example of a neural network 900, in accordance with some examples. As noted above, various aspects of the present disclosure can be performed using an intelligence engine. The intelligence engine may include, for example, one or more artificial intelligence algorithms, one or more machine learning models trained using training data input into one or more machine learning algorithms, one or more neural networks, or a combination thereof. The neural network 900 of FIG. 9 may be an example of the intelligence engine. The neural network 900 of FIG. 9 can be used to implement the machine learning based feature tracking, image segmentation, dynamic object detection and masking, and/or other operations described above. An input layer 920 includes input data. In one illustrative example, the input layer 920 can include data representing the pixels of an input image captured by one of the one or more cameras 210. The image may be a video frame. The neural network 900 includes multiple hidden layers 922*a*, 922*b*, through 922*n*. The hidden layers 922*a*, 922*b*, through 922*n* include "n" number of hidden layers, where "n" is an integer greater than or equal to one. The number of hidden layers can be made to include as many layers as needed for the given application. The neural network 900 further includes an output layer 924 that provides an output resulting from the processing performed by the hidden layers 922*a*, 922*b*, through 922*n*. In one illustrative example, the output layer 924 can provide a classification for an object in an input video frame. The classification can include a class identifying the type of object (e.g., a person, a dog, a cat, or other object). Based on the classification of type of object, the neural network 900, or a device that interacts with the neural network 900, can determine whether the object is a dynamic object or a static object. The classification can, in some cases, include directly whether the object is a dynamic object (e.g., a person, a cat, a vehicle, a display screen) or a static object (e.g., a wall, a floor, a ceiling, a sofa, a painting hanging on a wall, a lamp).

The neural network 900 is a multi-layer neural network of interconnected nodes. Each node can represent a piece of information. Information associated with the nodes is shared among the different layers and each layer retains information as information is processed. In some cases, the neural network 900 can include a feed-forward network, in which case there are no feedback connections where outputs of the network are fed back into itself. In some cases, the neural network 900 can include a recurrent neural network, which can have loops that allow information to be carried across nodes while reading in input.

Information can be exchanged between nodes through node-to-node interconnections between the various layers. Nodes of the input layer 920 can activate a set of nodes in the first hidden layer 922a. For example, as shown, each of the input nodes of the input layer 920 is connected to each of the nodes of the first hidden layer 922a. The nodes of the first hidden layer 922a can transform the information of each input node by applying activation functions to the input node information. The information derived from the transformation can then be passed to and can activate the nodes of the next hidden layer 922b, which can perform their own designated functions. Example functions include convolutional, up-sampling, data transformation, and/or any other suitable functions. The output of the hidden layer 922b can then activate nodes of the next hidden layer, and so on. The output of the last hidden layer 922n can activate one or more nodes of the output layer 924, at which an output is provided. In some cases, while nodes (e.g., node 926) in the neural network 900 are shown as having multiple output lines, a node has a single output and all lines shown as being output from a node represent the same output value.

In some cases, each node or interconnection between nodes can have a weight that is a set of parameters derived from the training of the neural network 900. Once the neural network 900 is trained, it can be referred to as a trained neural network, which can be used to classify one or more objects. For example, an interconnection between nodes can represent a piece of information learned about the interconnected nodes. The interconnection can have a tunable numeric weight that can be tuned (e.g., based on a training dataset), allowing the neural network 900 to be adaptive to inputs and able to learn as more and more data is processed.

The neural network 900 is pre-trained to process the features from the data in the input layer 920 using the different hidden layers 922a, 922b, through 922n in order to provide the output through the output layer 924. In an example in which the neural network 900 is used to identify objects in images, the neural network 900 can be trained using training data that includes both images and labels. For instance, training images can be input into the network, with each training image having a label indicating the classes of the one or more objects in each image (basically, indicating to the network what the objects are and what features they have). In one illustrative example, a training image can include an image of a number 2, in which case the label for the image can be [0 0 1 0 0 0 0 0 0 0].

In some cases, the neural network 900 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the neural network 900 is trained well enough so that the weights of the layers are accurately tuned.

For the example of identifying objects in images, the forward pass can include passing a training image through the neural network 900. The weights are initially randomized before the neural network 900 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the neural network 900, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 900 is unable to determine low level features and thus cannot make an accurate determination of what the classification of the object might be. A loss function can be used to analyze error in the output. Any suitable loss function definition can be used. One example of a loss function includes a mean squared error (MSE). The MSE is defined as $$E_{total} = \sum \frac{1}{2}(\text{target} - \text{output})^2,$$

which calculates the sum of one-half times the actual answer minus the predicted (output) answer squared. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 900 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

The neural network 900 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The neural network 900 can include any other deep network other than a CNN, such as an autoencoder, a deep belief nets (DBNs), a Recurrent Neural Networks (RNNs), among others.

FIG. 10 is a block diagram illustrating an example of a convolutional neural network (CNN) 1000, in accordance with some examples. The input layer 1020 of the CNN 1000 includes data representing an image, such as an image captured by one of the one or more cameras 210. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1022a, an optional non-linear activation layer, a pooling hidden layer 1022b, and fully connected hidden layers 1022c to get an output at the output layer 1024. While only one of each hidden layer is shown in FIG. 10, one of ordinary skill will appreciate that multiple convolutional hidden layers, non-linear layers, pooling hidden layers, and/or fully connected layers can be included in the CNN 1000. As previously described, the output can indicate a single class of an object or can include a probability of classes that best describe the object in the image. The classification can include a class identifying the type of object (e.g., a person, a dog, a cat, or other object). Based on the classification of type of object, the CNN 1000, or a device that interacts with the CNN 1000, can determine whether the object is a dynamic object or a static object. The classification can, in some cases, include directly whether the object is a dynamic object (e.g., a person, a cat, a vehicle, a display screen) or a static object (e.g., a wall, a floor, a ceiling, a sofa, a painting hanging on a wall, a lamp).

The first layer of the CNN 1000 is the convolutional hidden layer 1022a. The convolutional hidden layer 1022a analyzes the image data of the input layer 1020. Each node of the convolutional hidden layer 1022a is connected to a region of nodes (pixels) of the input image called a receptive field. The convolutional hidden layer 1022a can be considered as one or more filters (each filter corresponding to a different activation or feature map), with each convolutional iteration of a filter being a node or neuron of the convolutional hidden layer 1022a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1022a. Each connection between a node and a receptive field for that node learns a weight and, in some cases, an overall bias such that each node learns to analyze its particular local receptive field in the input image. Each node of the hidden layer 1022a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 1022a is due to each node of the convolutional layer being applied to its corresponding receptive field. For example, a filter of the convolutional hidden layer 1022a can begin in the top-left corner of the input image array and can convolve around the input image. As noted above, each convolutional iteration of the filter can be considered a node or neuron of the convolutional hidden layer 1022a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1022a. For example, a filter can be moved by a step amount (referred to as a stride) to the next receptive field. The stride can be set to 1 or other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1022a.

The mapping from the input layer to the convolutional hidden layer 1022a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 1022a can include several activation maps in order to identify multiple features in an image. The example shown in FIG. 10 includes three activation maps. Using three activation maps, the convolutional hidden layer 1022a can detect three different kinds of features, with each feature being detectable across the entire image.

In some examples, a non-linear hidden layer can be applied after the convolutional hidden layer 1022a. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the network 1000 without affecting the receptive fields of the convolutional hidden layer 1022a.

The pooling hidden layer 1022b can be applied after the convolutional hidden layer 1022a (and after the non-linear hidden layer when used). The pooling hidden layer 1022b is used to simplify the information in the output from the convolutional hidden layer 1022a. For example, the pooling hidden layer 1022b can take each activation map output from the convolutional hidden layer 1022a and generates a condensed activation map (or feature map) using a pooling function. Max-pooling is one example of a function performed by a pooling hidden layer. Other forms of pooling functions be used by the pooling hidden layer 1022a, such as average pooling, L2-norm pooling, or other suitable pooling functions. A pooling function (e.g., a max-pooling filter, an L2-norm filter, or other suitable pooling filter) is applied to each activation map included in the convolutional hidden layer 1022a. In the example shown in FIG. 10, three pooling filters are used for the three activation maps in the convolutional hidden layer 1022a.

In some examples, max-pooling can be used by applying a max-pooling filter (e.g., having a size of 2×2) with a stride (e.g., equal to a dimension of the filter, such as a stride of 2) to an activation map output from the convolutional hidden layer 1022a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1022a having a dimension of 24×24 nodes, the output from the pooling hidden layer 1022b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1000.

The final layer of connections in the network is a fully-connected layer that connects every node from the pooling hidden layer 1022b to every one of the output nodes in the output layer 1024. Using the example above, the input layer includes 28×28 nodes encoding the pixel intensities of the input image, the convolutional hidden layer 1022a includes 3×24×24 hidden feature nodes based on application of a 5×5 local receptive field (for the filters) to three activation maps, and the pooling hidden layer 1022b includes a layer of 3×12×12 hidden feature nodes based on application of max-pooling filter to 2×2 regions across each of the three feature maps. Extending this example, the output layer 1024 can include ten output nodes. In such an example, every node of the 3×12×12 pooling hidden layer 1022b is connected to every node of the output layer 1024.

The fully connected layer 1022c can obtain the output of the previous pooling hidden layer 1022b (which should represent the activation maps of high-level features) and determines the features that most correlate to a particular class. For example, the fully connected layer 1022c layer can determine the high-level features that most strongly correlate to a particular class, and can include weights (nodes) for the high-level features. A product can be computed between the weights of the fully connected layer 1022c and the pooling hidden layer 1022b to obtain probabilities for the different classes. For example, if the CNN 1000 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person). Since a person is considered a dynamic object, detection of a person is an example of detection of a dynamic object.

In some examples, the output from the output layer 1024 can include an M-dimensional vector (in the prior example, M=10), where M can include the number of classes that the program has to choose from when classifying the object in the image. Other example outputs can also be provided.

Each number in the N-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

FIG. 11 is a diagram illustrating an example of the Cifar-10 neural network 1100, in accordance with some examples. Various object detectors can be used to perform object detection and/or classification. One example includes a Cifar-10 neural network based detector 1100. In some cases, the Cifar-10 neural network can be trained to classify persons and cars only. As shown, the Cifar-10 neural network 1100 includes various convolutional layers (Conv1 layer 1102, Conv2/Relu2 layer 1108, and Conv3/Relu3 layer 1114), numerous pooling layers (Pool1/Relu1 layer 1104, Pool2 layer 1110, and Pool3 layer 1116), and rectified linear unit layers mixed therein. Normalization layers Norm1 1106 and Norm2 1112 are also provided. A final layer is the ip1 layer 1118.

Figure 12C:
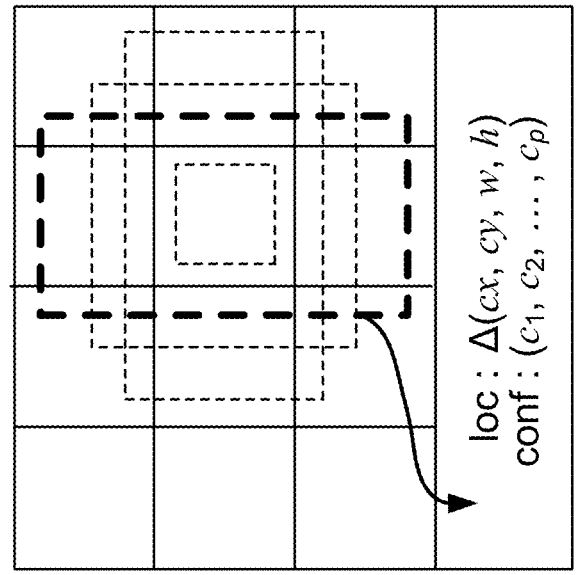
FIG. 12C is a conceptual diagram illustrating an example of a 4×4 feature map generated by a single-shot detector (SSD) based on the image in FIG. 12A.
Figure 12B:
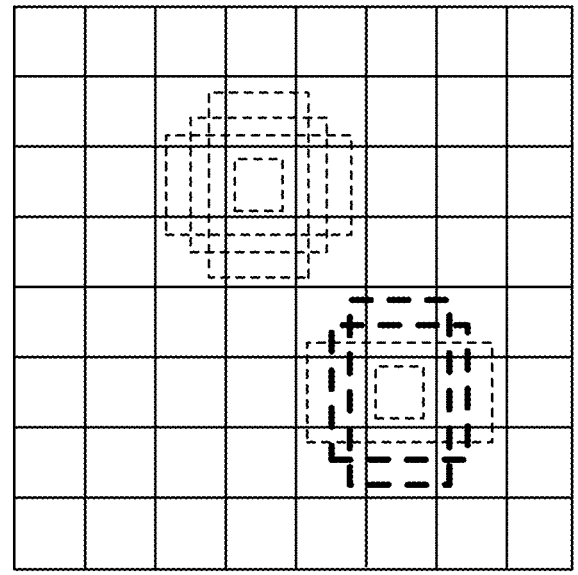
FIG. 12B is a conceptual diagram illustrating an example of an 8×8 feature map generated by a single-shot detector (SSD) based on the image in FIG. 12A.
Figure 12A:
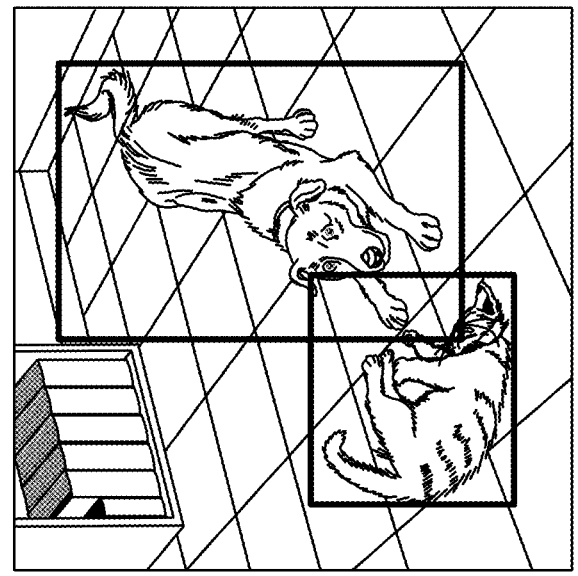
FIG. 12A is a conceptual is a conceptual diagram illustrating an example of an image with ground truth (GT) bounding boxes around two dynamic object, namely a cat and a dog.

FIG. 12A-FIG. 12C are conceptual diagrams illustrating an example of a single-shot object detector, in accordance with some examples. One deep learning-based detector that can be used to detect and/or classify objects in images includes the single-shot detector (SSD), which is a fast single-shot object detector that can be applied for multiple object categories or classes. FIG. 12A is a conceptual diagram illustrating an example of an image with ground truth (GT) bounding boxes around two dynamic object, namely a cat and a dog. The SSD model uses multi-scale convolutional bounding box outputs attached to multiple feature maps at the top of the neural network. Such a representation allows the SSD to efficiently model diverse box shapes. FIG. 12B is a conceptual diagram illustrating an example of an 8×8 feature map generated by a single-shot detector (SSD) based on the image in FIG. 12A. FIG. 12C is a conceptual diagram illustrating an example of a 4×4 feature map generated by a single-shot detector (SSD) based on the image in FIG. 12A. The diagrams of FIG. 12B and FIG. 12C illustrate how an SSD detector (with the VGG deep network base model) operates. For example, SSD matches objects with default boxes of different aspect ratios (shown as dashed rectangles in FIG. 12B and FIG. 12C). Each element of the feature map has a number of default boxes associated with it. Any default box with an intersection-over-union with a ground truth box over a threshold (e.g., 0.4, 0.5, 0.6, or other suitable threshold) is considered a match for the object. For example, two of the 8×8 boxes (shown in thick dashed lines in FIG. 12B) are matched with the cat, and one of the 4×4 boxes (shown in thick dashed lines in FIG. 12C) is matched with the dog. SSD has multiple features maps, with each feature map being responsible for a different scale of objects, allowing it to identify objects across a large range of scales. For example, the boxes in the 8×8 feature map of FIG. 12B are smaller than the boxes in the 4×4 feature map of FIG. 12C. In one illustrative example, an SSD detector can have six feature maps in total.

For each default box in each cell, the SSD neural network outputs a probability vector of length c, where c is the number of classes, representing the probabilities of the box containing an object of each class. In some cases, a background class is included that indicates that there is no object in the box. The SSD network also outputs (for each default box in each cell) an offset vector with four entries containing the predicted offsets required to make the default box match the underlying object's bounding box. The vectors are given in the format (cx, cy, w, h), with cx indicating the center x, cy indicating the center y, w indicating the width offsets, and h indicating height offsets. The vectors are only meaningful if there actually is an object contained in the default box. For the image shown in FIG. 12A, all probability labels would indicate the background class with the exception of the three matched boxes (two for the cat, one for the dog).

Figure 13A:
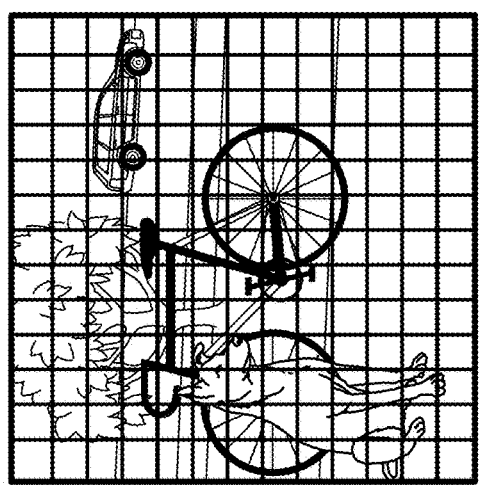
FIG. 13A is a conceptual diagram illustrating an example of an image depicting a bicycle and a dog in front of a tree and a car, divided into boxes using a grid.
Figure 13B:
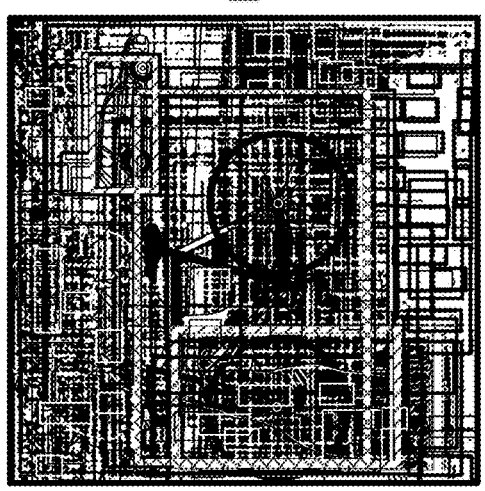
FIG. 13B is a conceptual diagram illustrating the image of FIG. 13A overlaid with predicted bounding boxes generated using a You Only Look Once (YOLO) detector.
Figure 13C:
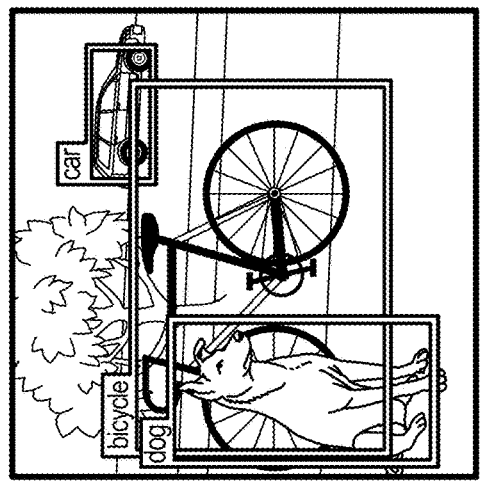
FIG. 13C is a conceptual diagram illustrating the image of FIG. 13A overlaid with high-confidence predicted bounding boxes along with corresponding classes for each bounding box generated using a You Only Look Once (YOLO) detector.

FIG. 13A-FIG. 13C are conceptual diagrams illustrating an example of a You Only Look Once (YOLO) detector, in accordance with some examples. Another deep learning-based detector that can be used to detect and/or classify objects in images includes the You Only Look Once (YOLO) detector, which is an alternative to the SSD object detection system. FIG. 13A is a conceptual diagram illustrating an example of an image depicting a bicycle and a dog in front of a tree and a car, divided into boxes using a grid. The diagrams of FIG. 13B and FIG. 13C illustrate how the YOLO detector operates. The YOLO detector can apply a single neural network to a full image. As shown, the YOLO network divides the image into regions and predicts bounding boxes and probabilities for each region. These bounding boxes are weighted by the predicted probabilities. For example, as shown in FIG. 13A, the YOLO detector divides up the image into a grid of 13-by-13 cells. Each of the cells is responsible for predicting five bounding boxes. A confidence score is provided that indicates how certain it is that the predicted bounding box actually encloses an object. This score does not include a classification of the object that might be in the box, but indicates if the shape of the box is suitable. The predicted bounding boxes are shown in FIG. 13B. FIG. 13B is a conceptual diagram illustrating the image of FIG. 13A overlaid with predicted bounding boxes generated using a You Only Look Once (YOLO) detector. The boxes with higher confidence scores have thicker borders. The image of FIG. 13B includes three boxes with particularly thick borders, including a first box shaded using diagonal-striped-patterned lines and drawn around the dog in the image, a second box shaded using crosshatched-patterned lines and drawn around the bicycle in the image, and a third box shaded using diagonal-striped-patterned lines and drawn around the car in the image.

FIG. 13C is a conceptual diagram illustrating the image of FIG. 13A overlaid with high-confidence predicted bounding boxes along with corresponding classes for each bounding box generated using a You Only Look Once (YOLO) detector. Each cell also predicts a class for each bounding box. For example, a probability distribution over all the possible classes is provided. Any number of classes can be detected, such as a bicycle, a dog, a cat, a person, a car, or other suitable object class. The confidence score for a bounding box and the class prediction are combined into a final score that indicates the probability that that bounding box contains a specific type of object. For example, the first box with thick borders having a diagonally-striped shading pattern on the left side of the image in FIG. 13B has an 85% confidence by the YOLO detector of including the object class "dog." The second box with thick borders having a crosshatch shading pattern in the center-left of the image in FIG. 13B has an 82% confidence by the YOLO detector of including the object class "bicycle." The third box with thick borders having a diagonally-striped shading pattern on the upper-right side of the image in FIG. 13B has an 88% confidence by the YOLO detector of including the object class "car." The dog may be considered a dynamic object. The bicycle and/or the car may each be considered a dynamic object in some cases, for example when a person is detected riding the bicycle or driving the car. The bicycle and/or the car may each be considered a static object in some cases, for example the detector detects that there is no person riding the bicycle, or that there is no person driving the car (e.g., the car is parked). There are 169 grid cells (13×13) and each cell predicts 5 bounding boxes, resulting in 1345 bounding boxes in total. Many of the bounding boxes will have very low scores, in which case only the boxes with a final score above a threshold (e.g., above a 30% probability, 40% probability, 50% probability, or other suitable threshold) are kept. FIG. 13C shows an image with the final predicted bounding boxes and classes, including a dog, a bicycle, and a car. As shown, from the 1345 total bounding boxes that were generated, only the three bounding boxes shown in FIG. 13C were kept because they had the best final scores. For example, the three bounding boxes may have had confidence scores exceeding a threshold (e.g., 80%).

Figure 14:
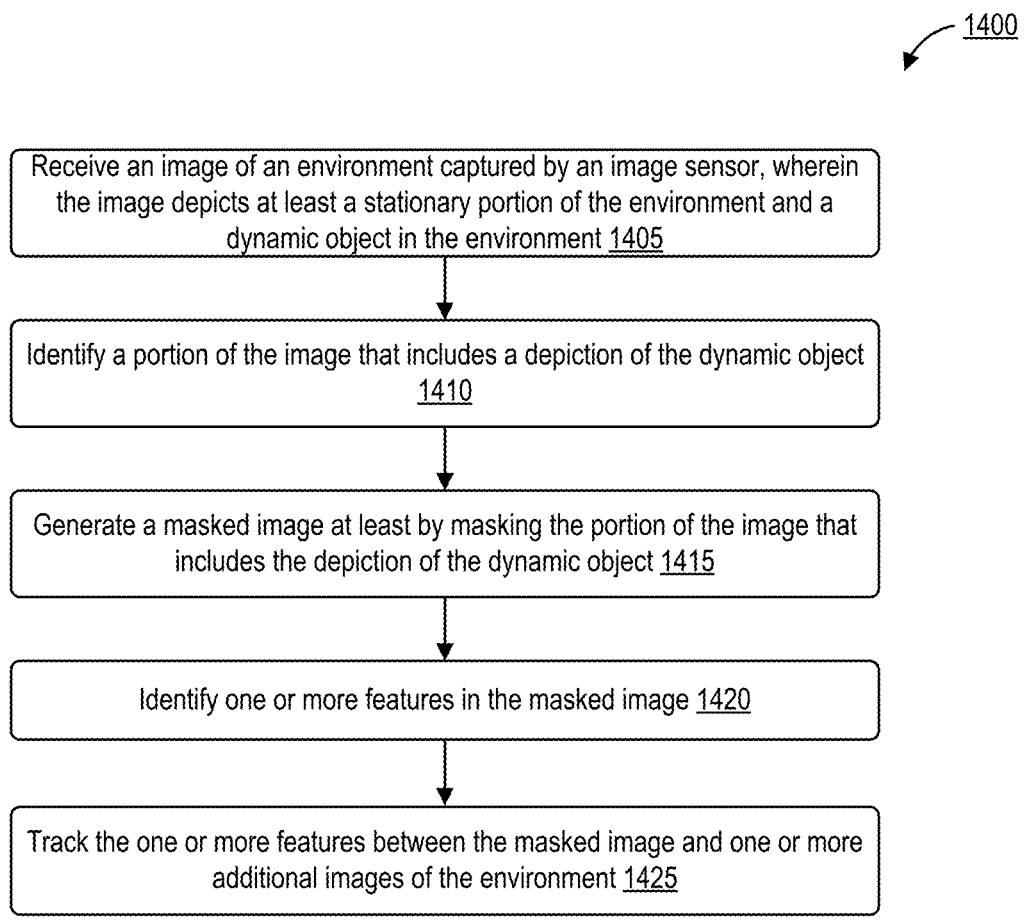
FIG. 14 is a flow diagram illustrating an example of an image processing technique, in accordance with some examples.

FIG. 14 is a flow diagram illustrating an example of a process 1400 implementing an image processing technique, in accordance with some examples. The image processing process 1400 of FIG. 14 may be performed by a device. The device may be, and/or may include, at least an image capture and processing system 100, an image capture device 105A, an image processing device 105B, a SLAM device 200A, a SLAM device 200B, an unmanned ground vehicle (UGV) 610, an unmanned aerial vehicle (UAV) 620, a head-mounted display (HMD) 710, a mobile device 850, a computing system 1500, any component or element of any of the previously-listed devices, any other type of device or device component mentioned herein, or some combination thereof.

At operation 1405, the device receives an image of an environment captured by an image sensor. The image depicts at least a stationary portion of the environment and a dynamic object in the environment. The static portion of the environment can be static relative to a position of the image sensor during capture of the image.

In some examples, the dynamic object moves relative to a position of the image sensor during capture of the image. For example, the dynamic object can be a living being such as a person or an animal, and may move about the environment over time. The dynamic object can be a vehicle that can also move about the environment over time. In some examples, the dynamic object changes its appearance within the environment between different images of the environment. The change in appearance of the dynamic object can be caused by a change in the dynamic object itself over time. For instance, the dynamic object can be (or can include) a display screen that can change its appearance by changing what is displayed on the display screen. The change in appearance of the dynamic object can be caused by a change in position of the device, the image sensor, or other objects in the environment. For instance, the dynamic object can be (or can include) a mirrored surface. The appearance of the mirrored surface can change if the device and/or image sensor moves, because the mirrored surface will reflect light from a different part of the environment after the device and/or image sensor moves compared to before the device and/or image sensor moves. The appearance of the mirrored surface can change if other objects in the environment move or other aspects of the environment move. For instance, a person who may or may not otherwise be depicted in the image may appear in a reflection in the mirrored surface. The person may move over time, changing the appearance of the mirrored surface even if the device, the image sensor, and the mirrored surface remain stationary. Certain dynamic objects, such as those with mirrored surfaces or specular surfaces, may change in appearance due changes in lighting in the environment.

At operation 1410, the device identifies a portion of the image that includes a depiction of the dynamic object. In some examples, the dynamic object is at least one of a person, an animal, a vehicle, a robot, a cloud, a star, a moon, a celestial body, a satellite, a display screen, a computing device, a mirrored surface, a reflective surface, and a specular surface. In some examples, the dynamic object can be an object that might be considered static or stationary in some circumstances, such as a plant or a curtain or a sail, but that is dynamic due to environmental conditions (e.g., wind).

In some aspects, identifying the portion of the image that includes the depiction of the dynamic object includes: analyzing each pixel of a plurality of pixels corresponding to the image to identify a subset of the plurality of pixels that depicts at least a portion of the dynamic object.

In some aspects, identifying the portion of the image that includes the depiction of the dynamic object includes: identifying a bounding box occupying a polygonal region of the image, wherein the depiction of the dynamic object is at least partially included within the bounding box. In some aspects, identifying the portion of the image that includes the depiction of the dynamic object includes: analyzing each pixel of a plurality of pixels within the bounding box to identify a subset of the plurality of pixels within the bounding box that each depict a portion of the dynamic object. In some aspects, to identify the bounding box, the one or more processors are configured to use at least a first trained neural network. In some aspects, to identify the subset of the plurality of pixels, the one or more processors are configured to use at least a second trained neural network.

In some aspects, identifying the portion of the image that includes the depiction of the dynamic object includes: identifying, using at least a first trained neural network, that the image includes the depiction of the dynamic object; and identifying, using at least a second trained neural network in response to identification that the image includes the depiction of the dynamic object, the portion of the image that includes the depiction of the dynamic object.

In some examples, the dynamic object is a person. The device identifying the portion of the image that includes the depiction of the dynamic object can include the device identifying a depiction of a face of the person. The device can identify the depiction of the face of the person using facial detection, facial recognition, facial tracking, object detection, object recognition, object tracking, feature detection, feature recognition, feature tracking, or a combination thereof. The device can identify the depiction of the face of the person using one or more trained neural networks and/or machine learning models.

The device can generate a downscaled image, for instance by downscaling the image. In some examples, the device identifying the portion of the image that includes the depiction of the dynamic object includes the device identifying a portion of the downscaled image that includes the depiction of the dynamic object. The device can generate a greyscale image, for instance by desaturating color in the image. In some examples, the device identifying the portion of the image that includes the depiction of the dynamic object includes the device identifying a portion of the greyscale image that includes the depiction of the dynamic object. In some examples, the device can generate a processed variant of the image that is processed using downscaling, upscaling, rescaling, conversion to greyscale, brightness adjustments, contrast adjustments, desaturating color, adjusting saturation of color, cropping, white balance adjustments, color space conversions, reduction in number of colors, blurring, Gaussian filtering, edge detection, filtering, distortion correction, blur correction, sharpening, other processing operations discussed herein, or a combination thereof. The device identifying the portion of the image that includes the depiction of the dynamic object includes the device identifying a portion of the processed variant of the image that includes the depiction of the dynamic object. In some examples, the image is radially distorted, for instance featuring barrel distortion or pincushion distortion, and the distortion correction in the processed variant of the image can correct and/or compensate for the radial distortion. Radial distortion may be due to a lens type of one or more lenses of the camera that includes the image sensor of operation 1405. For instance, the lens type may be a wide angle lens, an ultra-wide-angle lens, a fisheye lens, a telephoto lens, a zoom lens, or another type of lens. In some examples, the image includes motion blur, and the blur correction in the processed variant of the image can correct and/or compensate for the motion blur. The motion blur may, for instance, be caused by motion of the image sensor, by motion of one or more objects in the environment, or both.

In some examples, the device identifying the portion of the image that includes the depiction of the dynamic object is based on an output of a dynamic object identification engine that receives as input at least one of the image or a modified image based on the image. The dynamic object identification engine can include at least one artificial intelligence algorithm, at least one trained neural network, at least one trained machine learning model, or a combination thereof.

At operation 1415, the device generates a masked image at least by masking the portion of the image that includes the depiction of the dynamic object. In some examples, to mask the portion of the image that includes the depiction of the dynamic object, the device generates a mask having a same shape and a same size as the portion of the image that includes the depiction of the dynamic object. The device overlays the mask over the portion of the image that includes the depiction of the dynamic object. The device merges the mask with the image after overlaying the mask over the portion of the image that includes the depiction of the dynamic object. In some examples, the device blurs the mask before merging the mask with the image.

At operation 1420, the device identifies one or more features in the masked image. The one or more features can be in the static portion of the environment.

At operation 1425, the device tracks the one or more features between the masked image and one or more additional images of the environment. By masking the dynamic object, accuracy, precision, and efficiency of feature tracking of the one or more features between the masked image and one or more additional images of the environment improves, and errors are reduced. As a result, accuracy, precision, and efficiency are improved of the device (or a second device) performing mapping, localization, pose estimation, and/or other operations associated with SLAM. In some examples, feature tracking and/or SLAM functions may experience fewer false positives and more true positives.

In some examples, the device determines a location of a first feature of the one or more features based on tracking of the one or more features between the masked image and the one or more additional images of the environment. The device updates a map of the environment based on the location of the first feature. Updating the map of the environment based on the location can include adding the location of the first feature to the map. Updating the map of the environment based on the location can include modifying a prior location of the first feature in the map based on the location of the first feature. The map may, in some examples, include 3D positions 272, keyframes 270, map slices 275, map information 280, information received by the mapping engine 230, information generated by the mapping engine 230, information stored by the mapping engine 230, information sent by the mapping engine 230, or combinations thereof.

In some examples, the device determines a pose of the device within the environment based on tracking of the one or more features between the masked image and the one or more additional images of the environment. The pose of the device within the environment can include at least one of a location of the device, a pitch of the device, a roll of the device, and/or a yaw of the device. In some examples, the device determines a pose of the image sensor within the environment based on tracking of the one or more features between the masked image and the one or more additional images of the environment. The pose of the image sensor within the environment can include at least one of a location of the image sensor, a pitch of the image sensor, a roll of the image sensor, and/or a yaw of the image sensor. Either of these pose determinations may be used as the pose 285 of FIGS. 2A and/or 2B.

In some examples, the image also depicts the second dynamic object in the environment. The device can identify a second portion of the image that includes a second depiction of the second dynamic object. To generate the masked image, the device can be configured to mask the second portion of the image that includes the second depiction of the second dynamic object. In some examples, the first portion of the image that includes the depiction of the dynamic object overlaps with the second portion of the image that includes the second depiction of the second dynamic object. The device can use a single masked region to overlay over (and thus mask) both the first portion of the image that includes the depiction of the dynamic object and the second portion of the image that includes the second depiction of the second dynamic object. For instance, if two dynamic objects are adjacent to one another, one dynamic object is in front of the other dynamic object, and/or two dynamic objects are physically touching, then one masked region of the image can be overlaid over the image to cover the portions of the image that include depictions of both dynamic objects. The masked regions 355 and 360, for example, both mask two dynamic objects (two people) each. In some examples, the first portion of the image that includes the depiction of the dynamic object is distinct from the second portion of the image that includes the second depiction of the second dynamic object. The device can use separate masked regions to overlay over (and thus mask) the first portion of the image that includes the depiction of the dynamic object and the second portion of the image that includes the second depiction of the second dynamic object. For instance, if two dynamic objects appear are at least a particular distance apart from one another in the image, the device may use separate masked regions to overlay over (and thus mask) the separate portions of the image that include the depictions of the two dynamic objects. The separate masked regions 460, 465, 470, and 475, for example, all mask one dynamic object (one person) each.

In some examples, the device can receive a second image of the environment captured by the image sensor. The second image can be one of the one or more additional images of the environment. The device can identify a second portion of the second image that includes a second depiction of one of the dynamic object or a second dynamic object. The device can mask the second portion of the second image before tracking the one or more features between the masked image and one or more additional images of the environment. For instance, if the image and the second image are video frames, then by masking dynamic objects out of each frame of multiple video frames in the video, the device is making it easier to track features of the static portions of the environment in the video.

The image upscaling technique illustrated in FIG. 14 may also include any operation discussed illustrated in, or discussed with respect to, the process 500 illustrated in FIG. 5.

In some cases, one or more of the operations 1405-1425 of the process 1400 can be performed by a device that performs the one or more of the operations 505-545 of the process 500 of FIG. 5. In some cases, at least a subset of the image processing technique of FIG. 14 may be part of the VSLAM technique of FIG. 5. In some cases, at least a subset of the VSLAM technique of FIG. 5 may be part of the image processing technique of FIG. 14. The image processing technique of FIG. 14 may represent at least some of the operations of an image capture and processing system 100, an image capture device 105A, an image processing device 105B, a SLAM device 200A, a SLAM device 200B, an unmanned ground vehicle (UGV) 610, an unmanned aerial vehicle (UAV) 620, a head-mounted display (HMD) 710, a mobile device 850, a computing system 1500, or a combination thereof.

In some cases, at least a subset of the techniques illustrated by the processes 500 and 1400 may be performed remotely by one or more network servers of a cloud service. In some examples, the processes described herein (e.g., processes including operations 500 and 1400 and/or other process(es) described herein) may be performed by a computing device or apparatus. In some examples, the processes 500 and/or 1400 can be performed by the image capture device 105A of FIG. 1. In some examples, the processes 500 and/or 1400 can be performed by the image processing device 105B of FIG. 1. The processes 500 and/or 1400 can also be performed by the image capture and processing system 100 of FIG. 1. The processes 500 and/or 1400 can also be performed by the SLAM device 200A of FIG. 2A, the SLAM device 200B of FIG. 2B, the unmanned ground vehicle (UGV) 610 of FIG. 6A, the unmanned aerial vehicle (UAV) 620 of FIG. 6B, the head-mounted display (HMD) 710 of FIGS. 7A-7B, the mobile device 850 of FIGS. 8A-8B, a variation thereof, or a combination thereof. The processes 500 and/or 1400 can also be performed by a computing device with the architecture of the computing system 1500 shown in FIG. 15. The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the processes including operations 500 and/or 1400. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Figure 15:
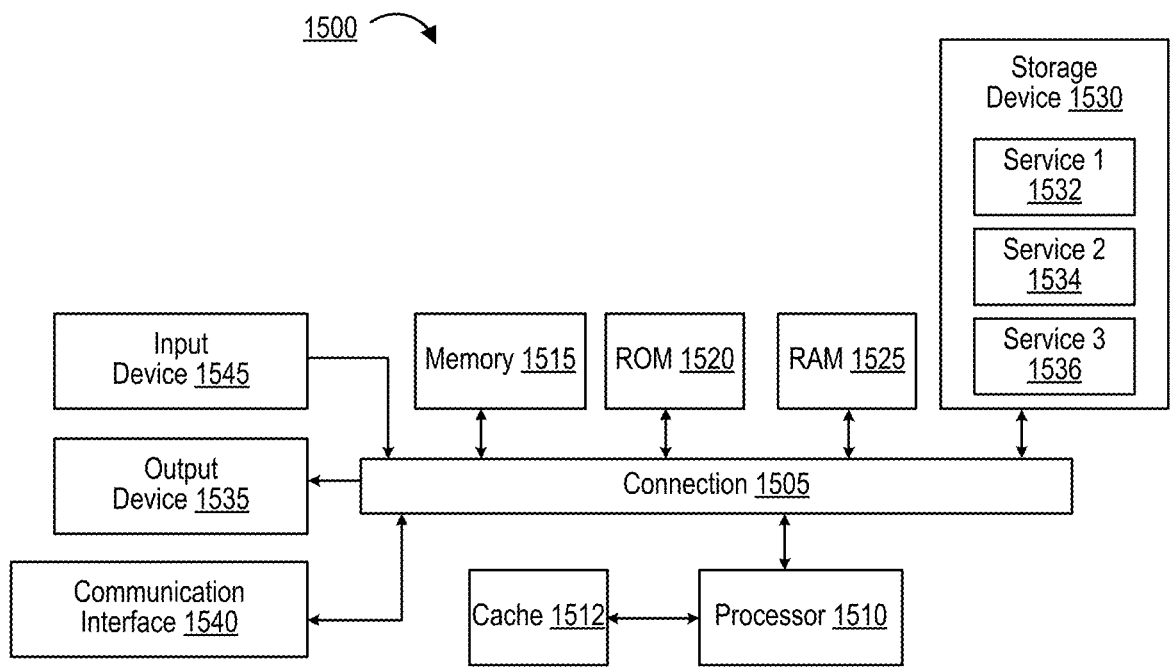
FIG. 15 is a diagram illustrating an example of a system for implementing certain aspects of the present technology.

The processes illustrated by block diagrams in FIG. 2A (of SLAM device 200A), FIG. 2B (of SLAM device 200B), and FIG. 15 (of system 1500) and flow diagrams 500 and 1400 are illustrative of or organized as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes illustrated by block diagrams 200A, 200B, and 1500 and flow diagrams 500 and 1400 and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 15 is a diagram illustrating an example of a system for implementing certain aspects of the present technology. In particular, FIG. 15 illustrates an example of computing system 1500, which can be for example any computing device making up internal computing system, a remote computing system, a camera, or any component thereof in which the components of the system are in communication with each other using connection 1505. Connection 1505 can be a physical connection using a bus, or a direct connection into processor 1510, such as in a chipset architecture. Connection 1505 can also be a virtual connection, networked connection, or logical connection.

In some embodiments, computing system 1500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1500 includes at least one processing unit (CPU or processor) 1510 and connection 1505 that couples various system components including system memory 1515, such as read-only memory (ROM) 1520 and random access memory (RAM) 1525 to processor 1510. Computing system 1500 can include a cache 1512 of high-speed memory connected directly with, in close proximity to, or integrated as part of processor 1510.

Processor 1510 can include any general purpose processor and a hardware service or software service, such as services 1532, 1534, and 1536 stored in storage device 1530, configured to control processor 1510 as well as a special-purpose processor where software instructions are incorporated into the actual processor design. Processor 1510 may essentially be a completely self-contained computing system, containing multiple cores or processors, a bus, memory controller, cache, etc. A multi-core processor may be symmetric or asymmetric.

To enable user interaction, computing system 1500 includes an input device 1545, which can represent any number of input mechanisms, such as a microphone for speech, a touch-sensitive screen for gesture or graphical input, keyboard, mouse, motion input, speech, etc. Computing system 1500 can also include output device 1535, which can be one or more of a number of output mechanisms. In some instances, multimodal systems can enable a user to provide multiple types of input/output to communicate with computing system 1500. Computing system 1500 can include communications interface 1540, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1540 may also include one or more Global Navigation Satellite System (GNSS) receivers or transceivers that are used to determine a location of the computing system 1500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1530 can include software services, servers, services, etc., that when the code that defines such software is executed by the processor 1510, it causes the system to perform a function. In some embodiments, a hardware service that performs a particular function can include the software component stored in a computer-readable medium in connection with the necessary hardware components, such as processor 1510, connection 1505, output device 1535, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. An apparatus for image processing, the apparatus comprising:
   a memory; and one or more processors coupled to the memory and configured to:
    identify a first portion of an image of an environment captured by an image sensor, wherein the first portion of the image depicts a first object in the environment and a second portion of the image depicts a second object in the environment;
    identify one or more features of the second object in a masked image, wherein the first portion of the image depicting the first object is masked in the masked image; and
    track the one or more features of the second object between the masked image and one or more additional masked images of the environment, wherein the first object is masked in the one or more additional masked images.

2. The apparatus of claim 1, wherein the one or more processors are configured to:
    determine a location of a first feature of the one or more features of the second object based on tracking of the one or more features of the second object between the masked image and the one or more additional masked images of the environment; and
    update a map of the environment based on the location of the first feature.

3. The apparatus of claim 2, wherein, to update the map of the environment based on the location, the one or more processors are configured to add the location of the first feature to the map.

4. The apparatus of claim 2, wherein, to update the map of the environment based on the location, the one or more processors are configured to modify a prior location of the first feature in the map based on the location of the first feature.

5. The apparatus of claim 1, wherein the one or more processors are configured to:
    determine a pose of the apparatus within the environment based on tracking of the one or more features of the second object between the masked image and the one or more additional masked images of the environment, wherein the pose of the apparatus within the environment includes at least one of a location of the apparatus, a pitch of the apparatus, a roll of the apparatus, or a yaw of the apparatus.

6. The apparatus of claim 1, wherein the one or more processors are configured to:
    generate a downscaled image at least by downscaling the image, wherein identifying the first portion of the image depicting the first object includes identifying a portion of the downscaled image that depicts the first object.

7. The apparatus of claim 1, wherein the one or more processors are configured to:
    generate a greyscale image at least by desaturating color in the image, wherein identifying the first portion of the image depicting the first object includes identifying a portion of the greyscale image that depicts the first object.

8. The apparatus of claim 1, wherein, to identify the first portion of the image depicting the first object, the one or more processors are configured to:
    analyze each pixel of a plurality of pixels corresponding to the image to identify a subset of the plurality of pixels that depicts at least a portion of the first object.

9. The apparatus of claim 1, wherein, to identify the first portion of the image depicting the first object, the one or more processors are configured to identify a bounding box occupying a polygonal region of the image, wherein the first object is at least partially included within the bounding box.

10. The apparatus of claim 9, wherein, to identify the first portion of the image depicting the first object, the one or more processors are configured to analyze each pixel of a plurality of pixels within the bounding box to identify a subset of the plurality of pixels within the bounding box that each depict a portion of the first object.

11. The apparatus of claim 10, wherein:
    to identify the bounding box, the one or more processors are configured to use at least a first trained neural network; and
    to identify the subset of the plurality of pixels, the one or more processors are configured to use at least a second trained neural network.

12. The apparatus of claim 1, wherein, to identify the first portion of the image depicting the first object, the one or more processors are configured to:
    identify, using at least a first trained neural network, that the image depicts the first object; and
    identify, using at least a second trained neural network in response to identification that the image depicts the first object, the first portion of the image that depicts the first object.

13. The apparatus of claim 1, wherein the first object is a dynamic type of object and the second object is a static type of object.

14. The apparatus of claim 13, wherein the dynamic type of object is a person, and wherein, to identify the first portion of the image depicting the first object, the one or more processors are configured to identify a depiction of a face of the person.

15. The apparatus of claim 13, wherein the static type of object is static relative to a position of the image sensor during capture of the image, wherein the dynamic type of object moves relative to a position of the image sensor during capture of the image.

16. The apparatus of claim 1, wherein the apparatus is one of a mobile device, a wireless communication device, a robot, a vehicle, a head-mounted display, and a camera.

17. The apparatus of claim 1, further comprising:
    the image sensor.

18. A method of image processing performed by a device, the method comprising:
    identifying a first portion of an image of an environment captured by an image sensor, wherein the first portion of the image depicts a first object in the environment and a second portion of the image depicts a second object in the environment;
    identifying one or more features of the second object in a masked image, wherein the first portion of the image depicting the first object is masked in the masked image; and
    tracking the one or more features of the second object between the masked image and one or more additional masked images of the environment, wherein the first object is masked in the one or more additional masked images.

19. The method of claim 18, further comprising:
    determining a location of a first feature of the one or more features of the second object based on tracking of the one or more features of the second object between the masked image and the one or more additional masked images of the environment; and
    updating a map of the environment based on the location of the first feature.

20. The method of claim 19, wherein updating the map of the environment based on the location comprises adding the location of the first feature to the map.

21. The method of claim 19, wherein updating the map of the environment based on the location comprises modifying a prior location of the first feature in the map based on the location of the first feature.

22. The method of claim 18, further comprising:
determining a pose of the device within the environment based on tracking of the one or more features of the second object between the masked image and the one or more additional masked images of the environment, wherein the pose of the device within the environment includes at least one of a location of the device, a pitch of the device, a roll of the device, or a yaw of the device.

23. The method of claim 18, further comprising:
generating a downscaled image at least by downscaling the image, wherein identifying the first portion of the image depicting the first object includes identifying a portion of the downscaled image that depicts the first object.

24. The method of claim 18, further comprising:
generating a greyscale image at least by desaturating color in the image, wherein identifying the first portion of the image depicting the first object includes identifying a portion of the greyscale image that depicts the first object.

25. The method of claim 18, wherein identifying the first portion of the image depicting the first object comprises:
analyzing each pixel of a plurality of pixels corresponding to the image to identify a subset of the plurality of pixels that depicts at least a portion of the first object.

26. The method of claim 18, wherein identifying the first portion of the image depicting the first object comprises identifying a bounding box occupying a polygonal region of the image, wherein the first object is at least partially included within the bounding box.

27. The method of claim 26, wherein identifying the first portion of the image depicting the first object comprises analyzing each pixel of a plurality of pixels within the bounding box to identify a subset of the plurality of pixels within the bounding box that each depict a portion of the first object.

28. The method of claim 27, wherein:
identifying the bounding box comprises using at least a first trained neural network; and
identifying the subset of the plurality of pixels comprises using at least a second trained neural network.

29. The method of claim 18, wherein identifying the first portion of the image depicting the first object comprises:
identifying, using at least a first trained neural network, that the image depicts the first object; and
identifying, using at least a second trained neural network in response to identification that the image depicts the first object, the first portion of the image that depicts the first object.

30. The method of claim 18, wherein the first object is a dynamic type of object and the second object is a static type of object.

31. The apparatus of claim 1, wherein the one or more processors are configured to:
map the environment based on the one or more features of the second object as tracked across the masked image and the one or more additional masked images.

* * * * *